United States Patent
Fletcher et al.

(10) Patent No.: US 12,413,805 B2
(45) Date of Patent: Sep. 9, 2025

(54) SYSTEMS AND METHODS FOR HIGH-RATE COMPOSITE VIDEO ACQUISITION

(71) Applicant: Mechanical Solutions Inc., Whippany, NJ (US)

(72) Inventors: Brian D. Fletcher, Hampton, NJ (US); Sergey Frolov, New Providence, NJ (US); William D. Marscher, Morristown, NJ (US)

(73) Assignee: MECHANICAL SOLUTIONS INC., Whippany, NJ (US)

( * ) Notice: Subject to any disclaimer, the term of this patent is extended or adjusted under 35 U.S.C. 154(b) by 241 days.

(21) Appl. No.: 17/992,540

(22) Filed: Nov. 22, 2022

(65) Prior Publication Data
US 2024/0171807 A1    May 23, 2024

(51) Int. Cl.
| | | |
|---|---|---|
| *H04N 21/43* | (2011.01) | |
| *H04N 7/18* | (2006.01) | |
| *H04N 21/234* | (2011.01) | |
| *H04N 21/262* | (2011.01) | |

(52) U.S. Cl.
CPC ....... *H04N 21/43072* (2020.08); *H04N 7/181* (2013.01); *H04N 21/23424* (2013.01); *H04N 21/2625* (2013.01)

(58) Field of Classification Search
CPC ............. H04N 21/43072; H04N 7/181; H04N 21/23424; H04N 21/2625
See application file for complete search history.

(56) References Cited

U.S. PATENT DOCUMENTS

| | | | |
|---|---|---|---|
| 4,393,394 A * | 7/1983 | McCoy | H04N 9/75 |
| | | | 348/601 |
| 4,881,125 A | 11/1989 | Krause | |
| 5,686,960 A | 11/1997 | Sussman et al. | |
| 7,706,634 B2 | 4/2010 | Schmitt et al. | |
| 7,746,404 B2 | 6/2010 | Deng et al. | |
| 8,155,384 B2 | 4/2012 | Chew | |
| 8,201,943 B2 | 6/2012 | Hammer et al. | |
| 8,487,996 B2 | 7/2013 | Mann et al. | |
| 8,794,521 B2 | 8/2014 | Joussen et al. | |
| 8,804,004 B2 | 8/2014 | Kato et al. | |
| 8,896,918 B2 | 11/2014 | Dixon | |

(Continued)

FOREIGN PATENT DOCUMENTS

| | | | |
|---|---|---|---|
| JP | 2003298936 | * | 4/2002 |
| TW | 202205204 | * | 7/2021 |

(Continued)

OTHER PUBLICATIONS

Yamada translation of JP 2003298936 Apr. 4, 2002 (Year: 2002).*

(Continued)

*Primary Examiner* — Zaihan Jiang
(74) *Attorney, Agent, or Firm* — Schmeiser, Olsen & Watts, LLP

(57) ABSTRACT

A method for high-rate video acquisition comprises providing a video sensor, providing a target area, providing a synchronization reference, capturing a plurality of videos of the target area, wherein each video of the plurality of videos captures a part of the target area, synchronizing the plurality of videos using the synchronization reference, and creating a composite video. Related systems and computer program products are also provided.

18 Claims, 14 Drawing Sheets

(56) References Cited

U.S. PATENT DOCUMENTS

| | | | |
|---|---|---|---|
| 9,049,381 B2 | 6/2015 | Venkataraman et al. | |
| 9,253,453 B2 | 2/2016 | Meidan et al. | |
| 10,382,680 B2 | 8/2019 | Polavarapu et al. | |
| 2003/0164045 A1 | 9/2003 | Argento et al. | |
| 2003/0185340 A1 | 10/2003 | Frantz | |
| 2009/0196606 A1* | 8/2009 | Miyagi | H04Q 11/0067 |
| | | | 398/45 |
| 2009/0256950 A1* | 10/2009 | Kawazoe | H04N 23/663 |
| | | | 348/E5.045 |
| 2010/0091134 A1* | 4/2010 | Cooke | H04N 23/667 |
| | | | 348/229.1 |
| 2010/0265313 A1 | 10/2010 | Liu et al. | |
| 2011/0252265 A1* | 10/2011 | Iwami | H04N 19/645 |
| | | | 713/401 |
| 2014/0015990 A1* | 1/2014 | Liang | H04N 23/66 |
| | | | 348/211.99 |
| 2016/0217587 A1 | 7/2016 | Hay | |
| 2016/0300341 A1 | 10/2016 | Hay et al. | |
| 2018/0101989 A1* | 4/2018 | Frueh | G06T 19/20 |
| 2018/0365859 A1* | 12/2018 | Oba | B60W 40/114 |
| 2020/0020075 A1 | 1/2020 | Khwaja et al. | |
| 2020/0065957 A1 | 2/2020 | Hay et al. | |
| 2020/0092468 A1 | 3/2020 | Mermelstein et al. | |
| 2022/0051366 A1* | 2/2022 | Roulet | G06T 3/40 |
| 2023/0328388 A1* | 10/2023 | Lu | H04N 25/626 |
| | | | 348/262 |

FOREIGN PATENT DOCUMENTS

| | | | |
|---|---|---|---|
| WO | WO-2004017033 | * | 8/2002 |
| WO | 0184209 A2 | | 11/2021 |

OTHER PUBLICATIONS

Hsieh translation of TW 202205204 Jul. 23, 2021 (Year: 2021).*

Boda translation of WO 2004017003 Aug. 12, 2002 (Year: 2002).*

Rembe, Christian et al. "Measuring MEMS in Motion by Laser Doppler Vibrometry"; Optical Inspection; Taylor & Francis Group, Edited by Wolfgang Osten. 51 pages.

Nagabhushan, P et al. "Mosaicing of Text Contents from Consecutive Frames in Pedestal Shot Videos" International Journal of Engineering Research & Technology (IJERT); ISSN: 2278-0181; vol. 4 Issue 07, Jul. 2015. 8 Pages.

Thesis Chapter 4: Mosaicing of Text Contens from Video Frames Enabling Text File Creation in Offline Videos. 45 pages.

D. A. Ehrhardt, et al., Full-field linear and nonlinear measurements using Continuous-Scan Laser Doppler Vibrometry and high speed Three-Dimensional Digital Image Correlation, Mech. Syst. Signal Process. (2016), http://dx.doi.org/10.1016/j.ymssp.2015.12.003. 16 pages.

J. Zheng et al.: Accurate Multi-Row Panorama Generation Using Multi-Point Joint Stitching; IEEE: "Special Section on Sequential Data Modeling and Its Emerging Applications" vol. 6, Jun. 19, 2018. 13 pages.

Gao, Xin et al. "Generation of Spatial-temporal Panoramas with a Single Moving Camera" Center for Intelligent Machines; McGill University; Montreal, Quebec, Canada. 2016, IEEE 13th Conference on Computer and Robot Vision; Doi 10.1109/CRV.2016.50. 7 pages.

Wang, Shengchun et al. "Railroad online: acquiring and visualizing route panoramas of rail scenes" Vis Comput; DOI 10.1007/s00371-013-0911-4; Springer-Verlag Berlin Heidelberg 2013. Published online: Dec. 29, 2013. 13 pages.

Suvarna, S. Kim et al. "Bancroft's Theory and Practice of Histological Techniques, Eighth Edition" ISBN 978-0-7020-6887-4 DOI: https://doi.org/10.1016/C2015-0-00143-5 Elsevier Ltd., 2019. 3 pages.

Mull, Adam. "3D Color Stereo Line-Scan Imaging—Addressing 3D Imaging Obstacles" DataLogic Automation Inc. Oct. 2015. 7 pages. https://www.photonics.com/Articles/3D_Color_Stereo_Line-Scan_Imaging_mdash/a57798.

* cited by examiner

SYSTEMS AND METHODS FOR HIGH-RATE COMPOSITE VIDEO ACQUISITION

TECHNICAL FIELD

The present invention relates to methods for observation and detection of motion, for example, vibration, rotation, and/or displacement of an object. The systems and methods may include or use multiple recordings from a camera system. The recordings may be synchronized to each other or to the motion of the object. The multiple recordings may include multiple recordings of different sections of the field of view. The different sections may be smaller than the full field of view, i.e., may be a subset of the full field of view. The multiple recordings may also be multiple recordings of the same field of view. Related systems and computer program products are also disclosed.

BACKGROUND

Detection systems such as camera systems or other sensor systems are used to detect and observe various types of motion. For example, camera systems are often used with rotating equipment and other machinery to detect/observe motion as part of analysis processes, maintenance processes, and the like. With respect to such equipment and machinery, even small motion and vibration may be important. For example, vibration may indicate improper operation, worn or defective components, or other problems that reduce efficiency, damage equipment, or are otherwise undesirable. Thus, detection of even small vibrations may be beneficial; however, camera systems often reach a fundamental limit past which vibrations are too small or occur too quickly to be detected.

This limit is often related to the frame rate and field of view of the camera. For example, many camera systems are only able to capture a full field of view at a specific frame rate. However, that specific frame rate may not be sufficient to capture vibrations, especially small vibrations or vibrations that occur very quickly, as discussed above. Adjusting the field of view to a smaller area may allow for an increased frame rate using the same camera or camera system. However, the smaller area may not capture the entire area of interest and thus may not capture the desired motion/vibration or may miss a portion thereof.

Thus, systems and methods for providing improved high-rate composite video acquisition and analysis would be well received in the art.

SUMMARY

An embodiment of the present invention relates to a method for high-rate video acquisition comprising providing a video sensor, providing a target area, providing a synchronization reference, capturing a plurality of videos of the target area, wherein each video of the plurality of videos captures a part of the target area, synchronizing the plurality of videos using the synchronization reference, and creating a composite video.

A further embodiment of the present invention relates to a method for high-rate video acquisition comprising providing a synchronization reference, capturing a plurality of videos of a target area, and creating a composite video from the plurality of videos of the target area, wherein the plurality of videos each capture a different part of the target area or the plurality of videos each capture the entire target area, wherein, when the plurality of videos each capture a different part of the target area, the plurality of videos are synchronized to the synchronization reference, and wherein, when the plurality of videos each capture the entire target area, the plurality of videos are synchronized to the synchronization reference but are each offset by a variable delay.

A further embodiment of the present invention relates to a computer program product comprising a computer readable hardware storage device storing a computer readable program code, the computer readable program code comprising an algorithm that when executed by a computer processor of a computing system implements a method for high-rate composite video acquisition, the method comprising capturing a plurality of videos of a target area, wherein each video of the plurality of videos captures a subset of the target area, synchronizing the plurality of videos using a synchronization reference, and creating a composite video from the plurality of videos of the target area.

DETAILED DESCRIPTION

Figure 1:
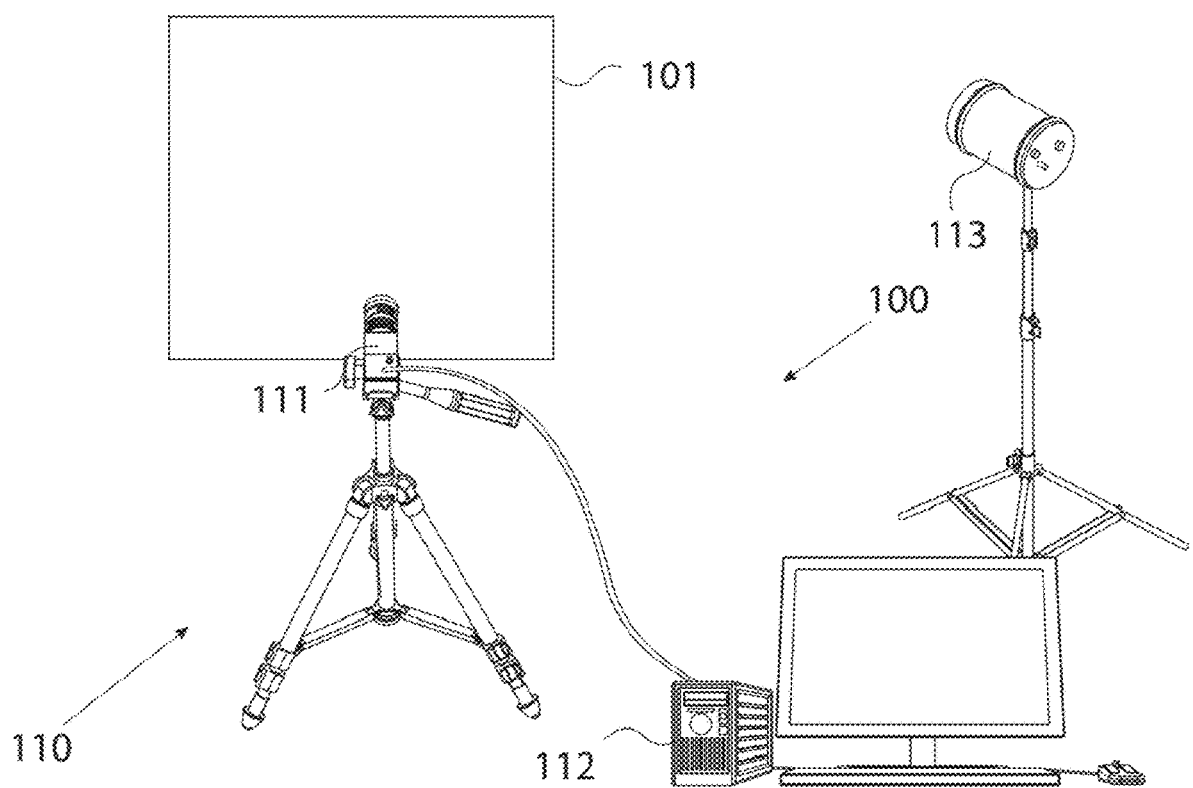
FIG. 1 depicts a schematic view of a scan system in accordance with embodiments of the present invention.

Motion and vibration detection may be important for analysis of machinery condition and operating state, for example, in rotating machinery, manufacturing equipment, transportation equipment, oil and gas equipment, power generation machinery, and other systems, comprising pumps, compressors, turbines, expanders, piping, pressure vessels, etc. Detection of even small motions and vibrations may be needed to provide a proper analysis of the machinery/system; however, detection of such small motions and vibrations may be difficult or impossible due to limits in the frame rate of a camera or camera system, especially when the motion/vibration occurs at a high frequency. For example, the camera system may not be able to accurately detect high frequency motion or vibration due to a frame rate that is too low.

Additionally, lower cost cameras that otherwise may have very good performance are limited to relatively low frame rates (e.g. <100 frames per second), thus requiring the expense of higher-end cameras for use cases where the characteristic motion or vibration frequencies are relatively high (e.g. >100 Hz). Further still in cases where frequencies of interest exceed 200 Hz, even high-end cameras may not have a frame rate that is sufficiently high, particularly when a large or maximum field of view is used (e.g. requiring the use of a full height of a video sensor).

In cameras, where video images may be acquired using different image resolutions or sizes, the maximum achievable acquisition frame rate may often be related to the size of the video sensor area that is utilized in the image capture. For example, the camera may have a certain base maximum frame rate when capturing images using the entire video sensor, corresponding to the full field of view for the camera. However, the same camera may be capable of achieving a higher frame rate when capturing images using a smaller part of the video sensor, corresponding to a subset of the full field of view (e.g. using a smaller number of rows in the video sensor).

This effect may be easily illustrated by considering that a typical video sensor is a rectangular array of pixels characterized by numbers of rows and columns, i.e. its height and width, respectively. Depending on the sensor design, the amount of time required to process the full video frame is proportional either to the total amount of used pixels or the number of used pixel rows. Therefore, configuring the sensor to use a smaller number of pixels or pixel rows may lead to a shorter processing time and a correspondingly higher frame rate, which is the inverse of the time interval between successive video frames.

For example, the maximum frame rate may increase as the height of the utilized area on the video sensor decreases, i.e., in this case the frame rate may increase with decreasing height of the utilized field of view. However, because of the decrease in the utilized field of view, the entire area of interest may not be captured and thus some or all portions of the desired motion or vibration may be missed.

Embodiments of the disclosed invention may allow a full field of view analysis at high frame rates by using multiple recordings of different or same sections of a target object or target area. For example, recordings of sections of a target object or target area may be captured by a sensor system/camera system. Further, a plurality of such synchronized recordings may be taken. The synchronized recordings may be any number of individual frames in length. These recordings may then be combined or assembled together to obtain the full field of view recording at frame rates higher than the base frame rate.

Embodiments of the disclosed invention in part make use of the repetitive nature of vibration in machinery. Because the nature of the motion/vibration is the same or similar throughout the full acquisition time frame, i.e., even over the plurality of synchronized recordings, various recordings of different sections may be captured over time, synchronized and then combined or assembled together for further analysis or to produce a composite video.

The plurality of recordings may be synchronized to ensure accurate combination or assembly. Synchronization may be achieved using a number of different methods, for example, by using an external electronic synchronization signal from an electronic sensor, an optical sensor or other electromechanical components, and/or by recording a common reference area, and/or by having a direct or indirect synchronization to an object, and/or by having a direct or indirect synchronization to an event, motion or feature of the object, such as for example a phase of a periodic motion or vibration of the object.

Referring now to the drawings, FIG. 1 depicts an example of a scan system 100 configured to implement embodiments of the present invention. The scan system 100 may perform a scan of a target area 101 as discussed in more detail below. The scan system 100 includes a sensor system 110. The sensor system 110 comprises at least one sensor device 111. The sensor system 110 may comprise a camera system in which the at least one sensor 111 comprises a camera device. For example, the sensor system may be capable of capturing video over a time interval. In such embodiments, the at least one sensor 111 may be referred to as a video sensor and the sensor system 110 may be referred to as a video sensor system. The sensor system 110 may also include a light source such as light source 113.

Referring still to FIG. 1, the sensor system 110 may comprise, or may be in communication with, a processor 112, for example, a processor of a computing system. The processor 112 may control the at least one sensor device 111. The processor 112 may also be configured to process and/or analyze information from the at least one sensor device 111, for example, video captured by the at least one sensor.

In embodiments, the sensor device 111 may comprise a sensor or a sensor array for capturing optical images or other serialized measurements (e.g. in optical or electronic scanning). The sensor array may be for example an image sensor comprising a rectangular imaging array of light detectors, such as imaging pixels. The image sensor may be configured to operate either a full pixel array or a part of the array. In the latter case, an image such as a frame of a video may be recorded only by a subset of the available pixels in a selected part of the image sensor. The processor 112 may be used to control the sensor device 111 and configure its operation, e.g. by selecting an active part of the image sensor and configuring what pixels may records images during video recordings or other measurements. The processor 112 may be either an internal processor integrated with the sensor device 111 or an external processor (e.g. a computer) connected externally to the sensor device 111. Furthermore, multiple processors may be used to control the sensor device 111, e.g. a combination of an internal and external processor or processors. Also, a single external processor may be used to control multiple sensor devices.

In embodiments, the sensor system 110 and/or the at least one sensor device 111 may be intended to capture video of an object (not shown) in the target area 101 for which motion and/or vibration is to be detected. In embodiments, the object may be, for example, a rotating machine or a component of the rotating machine. The object may be any type of object for which detection is desired.

In an embodiment, the sensor system 110 and/or the at least one sensor device 111 may be configured to capture data, such as video, of the target area 101 using multiple passes or scans. For example, in an embodiment, the sensor system 110 and/or the at least one sensor device 111 may capture multiple sections of the target area 101 sequentially.

For each section of the multiple sections, the sensor system 110 and/or the at least one sensor device 111 may capture a data set of sensor information, such as a plurality of image frames, all or a portion of pixels of multiple image frames, image pixels, sections of video files, entire video files, data relating to such images, data related to such pixels, data related to such frames, and the like.

Figure 2:
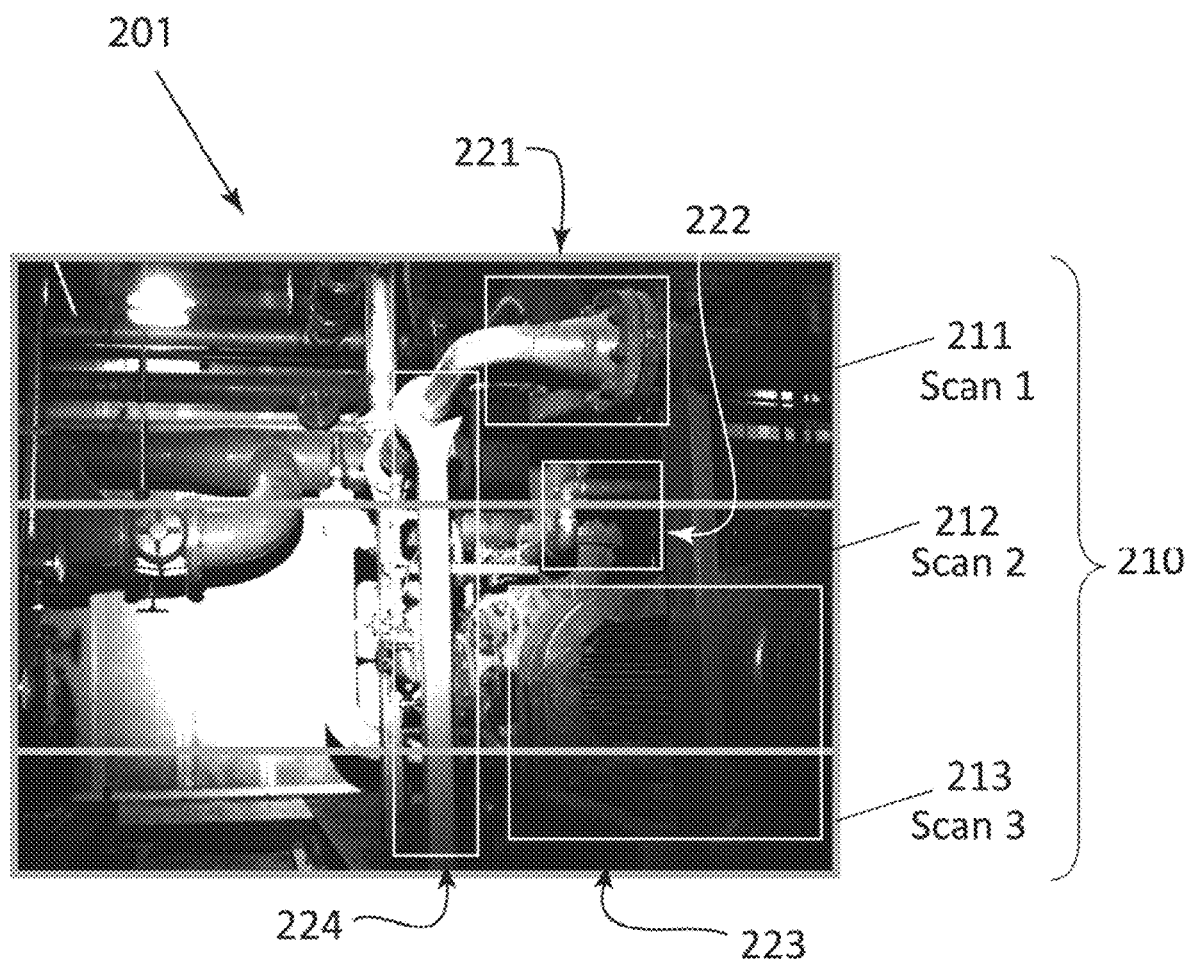
FIG. 2 depicts a schematic view of a field of view captured by multiple measurements in accordance with embodiments of the present invention.

In an exemplary embodiment of the present invention, FIG. 2 depicts multiple sections of a target area 201 being captured in multiple passes/scans, for example, using a plurality of recordings where each recording corresponds to a specific section or part of the overall target area 101. In this example, the depicted embodiment shows how three separate scans may produce video recordings of different field of view sections 211, 212, and 213 that together comprise a full field of view 210. The full field of view may be defined by the size and geometry of an image or other sensor in the sensor device, e.g. by a projection of this sensor on the target area. In case of the optical projection via a lens, the geometry of the sensor and its sections will be projected onto the geometry of the full field of view and its sections in the target area. Each scan may be done at a higher frame rate than the base frame rate (the maximum frame rate at a full field of view), which allows subsequent video data processing with a finer temporal resolution and a correspondingly wider range of frequencies compared to the regular video acquisition methods across the entire field of view 210. FIG. 2 also depicts representative objects 221, 222, 223, and 224 for which different motion and vibrations may be detected. For example, a piping 221 may be observed in scan 1 that covers section 211, a piping 222 may be observed in scans 1 and 2 that cover both sections 211 and 212, a motor 223 may be observed in scans 2 and 3 that cover sections 212 and 213, and a railing 224 may be observed in scans 1, 2 and 3, covering all three sections 211, 212, and 213. Monitoring of the piping 221 is possible using regular video acquisition approaches, since it has a limited extent over the field of view and can be covered by a single scan (e.g. scan 1 covering section 211). However, regular video acquisition approaches fail when attempting to monitor larger objects like the piping 222, the motor 223, the railing 224, or larger scenes that may include multiple objects like objects 221, 222, 223, and 224 that require simultaneous and/or synchronous observation.

The plurality of scans or video recordings may be taken sequentially by a single sensor or camera. For example, a camera, such as the sensor system 110 and/or the at least one sensor device 111 may capture scan 1 followed by scan 2 and so on. In embodiments, it may be preferable (but not required) to select the scan areas that are adjacent to each other and completely cover the full field of view. Of course, it will be understood that any other order may be followed (for example in reverse). Further, in some embodiments the target area may be divided into multiple areas in other ways, for example, into sections other than the horizontal rectangles as shown in FIG. 2. Also, the target area sections may be overlapping and/or non-overlapping regions; they may be different or similar in size or shape. Likewise, in an embodiment, an orientation of the sensor system 110 and/or the at least one sensor device 111 may be altered and may allow for data capture in alternative directions. Furthermore, a subset of scans may be selected with corresponding sections that do not cover the entire field of view, but only certain areas of interest that contain objects to be monitored (for example scan 1 and scan 2, or scan 1 and scan 3).

The plurality of scans or video recordings may be synchronized. For example, in an embodiment, the sensor system 110 and/or the at least one sensor device 111 may synchronize the individual recording or capturing of data between the plurality of scans. Scan synchronization may be accomplished by several suitable methods, including, for example, time stamping, electronic triggering, pre- or post-acquisition data analyses, and other means. In an embodiment, synchronization may be achieved by synchronizing the start time of each video recording. In embodiments, each video recording may have a consistent or constant duration as well. As an example, in an embodiment the scans may produce video files, 10 seconds in length each. Alternatively, the video files may be any time in duration or any number of frames in length. In embodiments, it may preferable (but not required) to produce at least 100, or 1000, or more, if possible, frames or time samples per scan in some embodiments, since a larger scan time span or number of frames or samples may result in a finer (better) frequency resolution after a frequency transform (e.g. FFT) of time-series data. Similarly, the videos or measurements in different scans may be done at different acquisition or frame rates.

Alternatively or additionally, in some embodiments, the plurality of video recordings may be synchronized with each other by using a motion of an object as a timing reference (for example using the motor 223). For example, the sensor system 110 and/or the at least one sensor device 111 may be synchronized to the object 223, to a motion of the object 223, to a phase of the object 223's vibration, etc. For example, the sensor system 110 and/or the at least one sensor device 111 may be synchronized to a dynamic event of an object or to a dynamic event associated with the object. In some embodiments the sensor system 110 and/or the at least one sensor device 111 may be synchronized to a timing of the object or other aspect of the object. In some embodiments, the dynamic event of an object may be an expected or known motion. In embodiments where the object is a rotating machine, the at least one sensor device 111 may be synchronized to the rotation of the rotating machine, i.e., the dynamic event may be the rotational position of the rotating machine, phase of the machine, or the like. In other embodiments, the dynamic event may be an impulse on the object or the timing of some other action taken by, or taken with respect to, the object. Synchronization of the at least one sensor device 111 may be of any kind, for example, direct or indirect, optical, electrical, or mechanical, and the like. In some embodiments, synchronization may be accomplished by at least one of a key phasor, directly measured vibration, recording frames at a known rate, excitation source, and the like.

In an embodiment, synchronization of the plurality of video recordings may entail that each respective recording begins at a common point with respect to the motion of the object 223, or with respect to the phase of the object 223's vibration, or the like.

Further, while the plurality of video recordings may be acquired from a single source, such as the sensor device 111, a plurality of sensor devices, such as a plurality of cameras, may also be used.

The plurality of video recordings may be combined to form a single composite recording, i.e., a composite video file or the like. The composite recording may then be processed or analyzed using conventional methods. For example, the analysis or processing may include extraction of data from the composite recording, including extraction of displacement data and other information. Such data may be extracted on a pixel by pixel basis as would be known in the art, where each pixel may for example provide a time-series data of light intensity measurement versus time.

Alternatively, the processing may be performed "on the fly" or "in-memory" as the scans are captured, and a composite analysis may be generated, with or without saving the composite video recordings.

For example, the composite recording may be analyzed for vibration, displacement, and other issues. This analysis may be performed using conventional means. For example, the analysis may be similar to and/or include features of the processing discussed above.

The analysis may include calculating a motion or vibration of an observed object (e.g. object 223). In some embodiments, the motion may be an unexpected or undesired motion, for example, due to a defect, abnormality, or other issue. In some embodiments, the motion may be a displacement and displacement data for the averaged synchronized data set may be calculated. In an embodiment, such displacement data may be analyzed on a pixel by pixel basis as would be known in the art.

The analysis may also include the creation/generation of video representations showing the detected motion. Altered, enhanced, modified, and/or magnified videos may also be used, either as part of the initial creation/generation or by further processing. For example, displacement and/or motion may be increased, scaled, magnified, amplified, or otherwise changed so that the displacement and/or motion is more noticeable.

As discussed above, each individual recording of the plurality of recordings, may have a higher frame rate and/or a smaller field of view than the standard or maximum frame rate and field of view of the sensor device 111 and/or the sensor system 110. This higher frame rate and/or smaller field of view may facilitate improved detection of even small motions, for example, smaller vibration levels, not readily observable or detectable by a naked eye.

Figure 3:
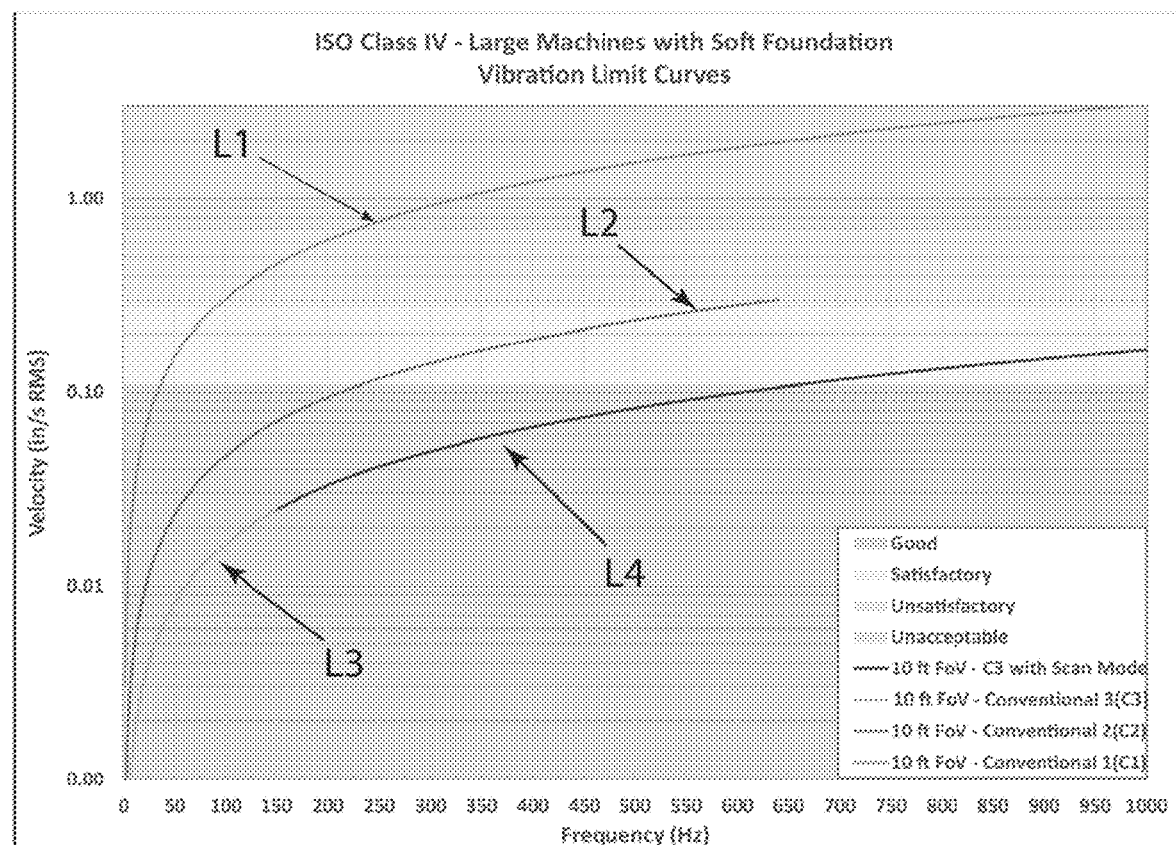
FIG. 3 depicts an ISO Class IV—Large Machines with Soft Foundation Specification for vibration along with limit lines of conventional camera systems and a scan system according to embodiments of the present invention.

Vibration detection is discussed in more detail with respect to FIG. 3. FIG. 3 depicts an ISO Class IV—Large Machines with Soft Foundation Specification for Vibration. Vibration velocity (in/s RMS) is shown on the vertical axis and is divided into four zones, good, satisfactory, unsatisfactory, and unacceptable. As shown, for this class of machines, small vibrations (up to approximately 0.3 in/s RMS) are considered acceptable (good or satisfactory). Larger vibrations are flagged as problematic (unsatisfactory or unacceptable).

In order to evaluate vibration velocity according to this scale, sensor systems must be able to detect the vibration. Vibration limit curves showing detection limits of various conventional camera systems are shown. For example, vibration limit curves are shown for exemplary conventional cameras C1, C2, and C3 using a 10 foot field of view. The conventional cameras C1, C2, and C3 differ in their typical frame rates, light sensitivities and price ranges. For example, the higher price camera C1 is characterized by a high maximum frame rate in excess of 2000 frames per second and motion detection threshold of 1.4 mils peak-to-peak (pk-pk) at 10 foot field of view. The middle price camera C2 is characterized by a medium maximum frame rate in excess of 1200 frames per second and motion detection threshold of 0.15 mils pk-pk at 10 foot field of view. Finally, the lower price camera C3 is characterized by a low maximum frame rate of about 300 frames per second and motion detection threshold of 0.05 mils pk-pk at 10 foot field of view. The lower detection limit on lower priced cameras may be due to for example their relatively better sensitivity, lower noise performance, and/or larger sensor size in comparison to higher priced cameras. The limit lines depict the vibration detection (in/s RMS) limit at respective frequency (Hz). Vibration amounts above the limit line (larger than the limit line) can be detected and vibration amounts below the limit line (smaller than the limit line) cannot be detected by the respective camera.

For example, conventional camera C1's limit is shown as line L1 that very quickly crosses over into the unacceptable range of the chart, for example, at approximately 225 Hz. In fact, conventional camera C1 (line L1) is capable of providing detection of vibration under 0.010 in/s RMS only if the frequency of the vibration is well below 50 Hz. Likewise, at a frequency of 100 Hz, conventional camera C1 is only able to detect vibration that is already within the unsatisfactory range, i.e., over 0.3 in/s RMS. Thus, at frequencies higher than approximately 100 Hz conventional camera C1 is unable to detect any portions of the satisfactory vibration range. For vibration over 225 Hz, conventional camera C1 is unable to capture vibration in the good, satisfactory, and unsatisfactory ranges; C1 would only be able to capture vibration that is greater than 0.7 in/s RMS. Thus, conventional camera C1 is not useful for capturing or analyzing vibrations occurring at these higher frequencies. This limitation is due to a relatively high noise floor of conventional camera C1. Using a 10 foot field of view, conventional camera C1's sensitivity is not high enough to detect motion anything other than relatively large motion at higher frequencies.

Conventional camera C2's limit is shown as line L2. While conventional camera C2 demonstrates a better performance than C1, it is also incapable of detecting vibration smaller than 0.10 in/s RMS at frequencies higher than approximately 225 Hz. Further, at frequencies approaching 650 Hz, conventional camera C2 cannot detect vibration in the good and satisfactory ranges but can only detect unsatisfactory and unacceptable vibrations. In fact, conventional camera C2's maximum frequency range is limited to 650 Hz; conventional camera C2 cannot be used for detection of any vibrations occurring at approximately 650 Hz or higher with the full field of view. This limitation is due to both a limited frame rate of conventional camera C2 and its relatively high noise floor. Using a 10 foot field of view, conventional camera C2's frame rate is not high enough to detect acceptable range of motion at higher frequencies.

Conventional camera C3's limit is shown as the line L3. Conventional camera C3 demonstrates good detection of small vibrations up to approximately 150 Hz. However, the frequency range is limited to 150 Hz; conventional camera C3 cannot be used for detection of vibrations occurring at approximately 150 Hz or higher with the full field of view. This is due to the limited frame rate of conventional camera C3 when a 10 foot full field of view is used.

However, line L4 shows the limit of conventional camera C3 using embodiments of the disclosed invention. The same full field of view is used as with L1-L3; however, this field of view is captured in multiple sections using multiple recordings, for example, multiple measurements such as scans 1-3 discussed above. As discussed above, when multiple smaller sections are used, the frame rate of the conventional camera C3 may be increased, enabling detection of vibration at higher frequencies. This approach may also require C3 cameras to have the capability to reconfigure its field of view, e.g. by selecting an active portion of an imaging sensor. Alternatively, a C3 camera may be mounted on a pan-and-tilt stage, so that its orientation may be changed to select a desired field-of-view (e.g. in a camera with limited sensor configuration abilities).

This may be used to effectively extend the high frequency cut-off point of the L3 curve to much higher frequencies. For example, as shown in the figure, using the disclosed methods, conventional camera C3 can be used to detect vibration at all frequencies on the chart. Further, conventional camera C3 would be able to detect any unsatisfactory or unacceptable vibration (as determined by the ISO Class IV Specification) at all depicted frequencies, e.g., up to 1,000 Hz. Equivalently, this approach may be used to increase the observed field of view while maintaining the same screen resolution, for example from 10 ft to 20 ft, to allow simultaneous observation of larger objects or multiple objects vibrating at high frequencies or moving at high velocities that are still within the good and satisfactory ranges of motion. Thus, embodiments of the present invention performed using conventional camera C3 would ensure that any problematic vibration would be detected regardless of frequency, even though conventional camera C3 is typically insufficient for this analysis.

Using embodiments of the disclosed invention as discussed above, detection can be improved even for relatively low cost or low speed cameras. Thus, hardware costs may be minimized while appropriate detection levels are still reached. Of course, embodiments of the disclosed invention may be also applied to high-cost and/or high-speed cameras and provide further improvements over their default detection capability.

Figure 4:
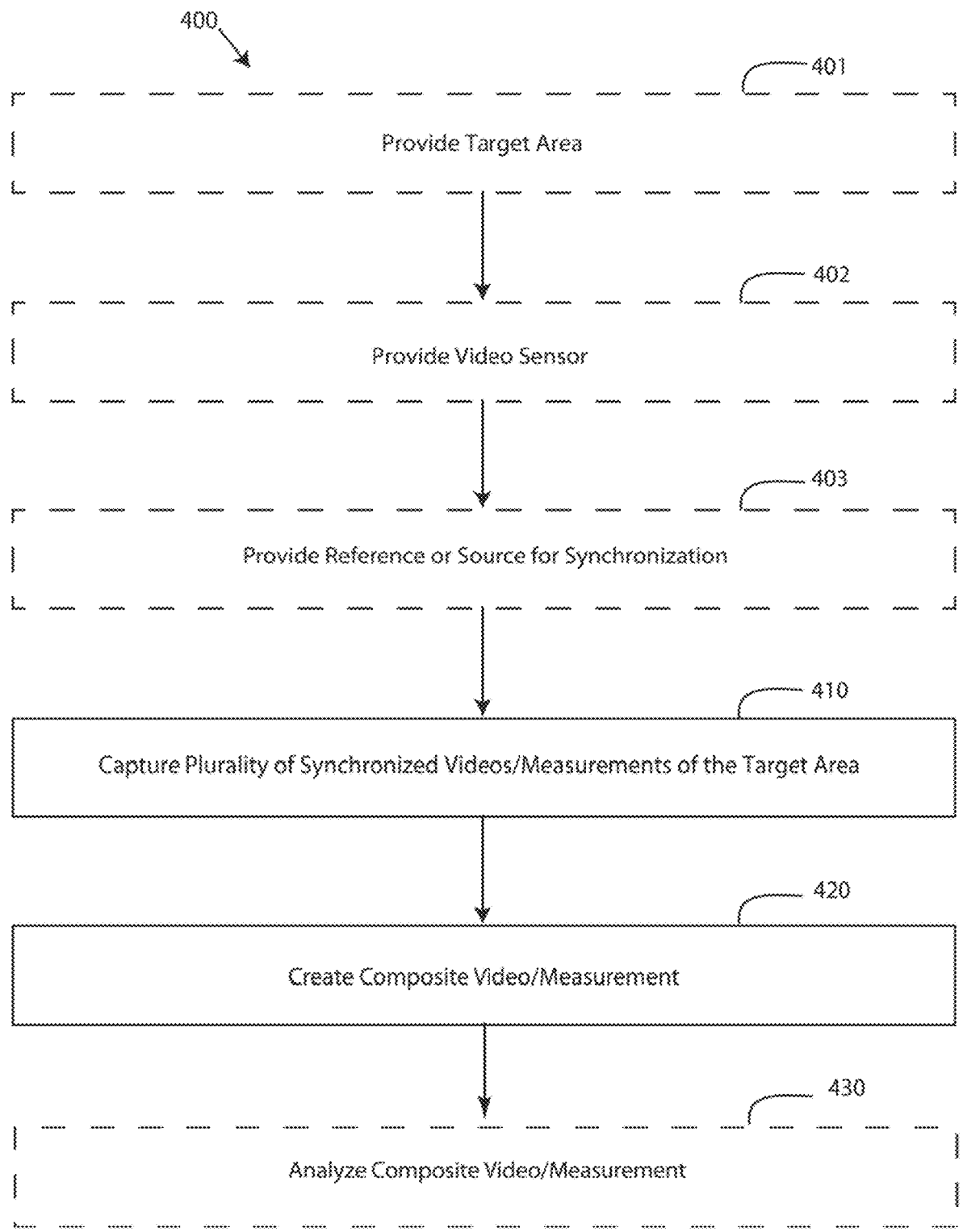
FIG. 4 depicts a flow chart of a method for high-rate composite video acquisition according to embodiments of the present invention.
Figure 5:
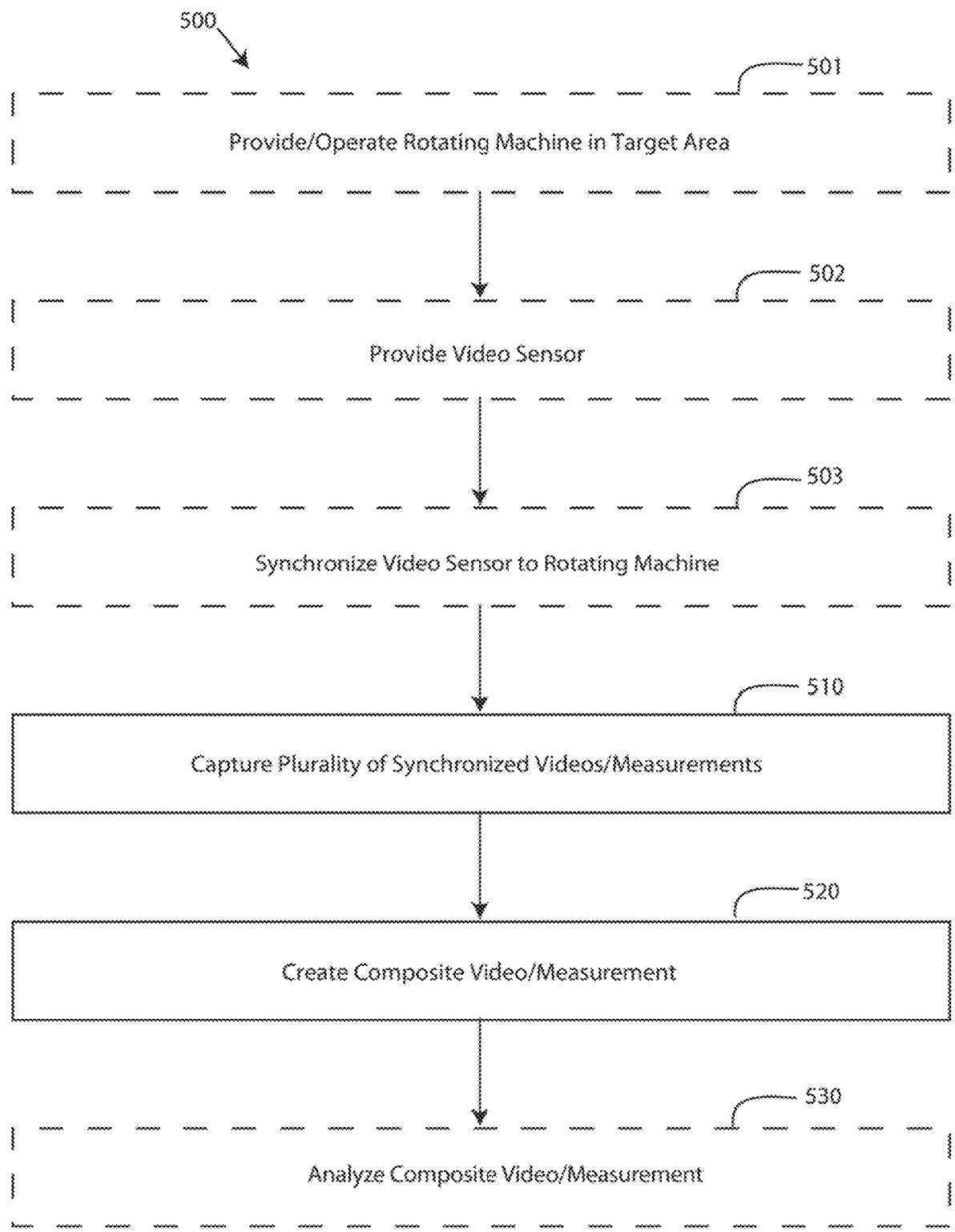
FIG. 5 depicts a flow chart of a method for high-rate composite video acquisition according to further embodiments of the present invention.

FIGS. 4 and 5 depict exemplary methods of embodiments of the disclosed invention.

FIG. 4 depicts a flow chart of a method 400 for high-rate composite video acquisition in accordance with embodiments of the present invention. Embodiments of the method 400 may begin with optional step 401, wherein the target area is provided and/or optional step 402, wherein a video sensor or a video sensor system comprising a camera system, such as the video sensor 111 of the sensor system 110, is provided. Alternatively, the video sensor system may comprise at least one of the following different sensor systems, such as an optical sensor array, an RF sensor array, infrared or thermal camera, an X-ray sensor array or camera, or other electrical or optical sensor arrays capable of capturing and recording spatially and temporally varying measurements, e.g. measurements of electro-magnetic radiation or light intensity. Alternatively, the video system may include a plurality of the same or different video sensor types described above.

Alternatively, the video sensor may be a different type of electrical, magnetic, optical, acoustic or mechanical sensor that may produce video-like data or measurements, i.e., an array (one, two, or multi-dimensional array) of real-time measurements of some physical property or properties of one or multiple objects. Data position and associated indices in this data array may be correlated with specific spatial positions in the target area. For example, such a sensor may be a line or area scanner producing an array of measurements, each corresponding to a particular scanner direction. For example, in a range scanner each measurement would correspond to a range in a given direction.

The target area may include objects of interest that are measured or recorded, or objects of interest with associated events, e.g. synchronization events. The target area may be continuous or comprised of multiple regions or areas. The provided video sensor system may be characterized by a maximum field of view, which provides a complete coverage of the target area and/or objects of interest within the target area.

In addition, the method 400 may comprise an optional step 403 of providing a reference or source for video synchronization. The specific synchronization mechanisms are described in more detail below.

In alternative embodiments, one or more of steps 401, 402, and 403 may not be required, for example, the method 400 may begin with step 410.

In step 410, a plurality of synchronized videos or measurements of the target area are captured by the video sensor system. The plurality of synchronized videos or measurements of the target area may comprise, for example, a plurality of video sequences. As discussed above, the plurality of synchronized videos of the target area may be synchronized with each other and/or may be synchronized to an object, a motion of an object, a phase of an object's vibration, etc. For example, the plurality of synchronized videos of the target area may each begin at a specific selected position in the rotation of a rotating machine or may otherwise be synchronized. Further, if desired, the plurality of synchronized videos may each comprise an identical duration, length and/or number of frames. Alternatively, different durations and number of frames may be used. In some embodiments, individual frames may be synchronized, or groups of frames may be synchronized.

In step 410 a single camera or sensor may be used to produce videos or measurements for the entire target area. In one embodiment, the camera or sensor position and orientation may be constant or fixed, so that its full field of view corresponds to or at least encompasses the target area. In this case, individual recordings of videos or measurements may correspond to scan areas that are smaller parts or sections of the target area and correspondingly, the full field of view. The videos and measurements are respectively produced by reconfiguring the acquisition by the camera or the sensor to process only the scan areas as described above. In another embodiment, the camera or sensor position and/or orientation may be different for different recordings of videos or measurements. In this case, the target area may be larger than the full field of view of the camera or sensor. Thus, individual recordings of videos or measurements may be done by repositioning the camera or the sensor to cover a part of the target area. In this case, the scan area of the camera or the sensor may or may not correspond to the full field of view.

Alternatively, in step 410 multiple cameras and/or sensors may be used to produce videos or measurements for the entire target area. In this case, the target area may be larger than the full field of view of an individual camera or sensor. Thus, individual recordings of videos or measurements may cover only a part of the target area. In this case, the scan area of the camera or the sensor may or may not correspond to the full field of view.

As discussed above, the plurality of synchronized videos or measurements may capture a field of view that is smaller than a maximum field of view for the video sensor system. Further, a frame rate of the video sensor for the reduced field of view may be greater than a frame rate of the camera for a maximum field of view. In an embodiment, the plurality of synchronized videos of the target area have an increased aspect ratio compared to the maximum field of view (i.e. an increased width to height ratio). In an embodiment, the plurality of synchronized videos of the target area may comprise a plurality of rectangular sections of the target area.

As mentioned above and discussed in further detail below, it will be understood that synchronization may be achieved at the time of capturing or as a subsequent step. Thus, in some embodiments, step 410 may comprise separate steps of capturing a plurality of videos or measurements of the target area and then synchronizing the videos or measurements.

In step 420, a composite video or measurement may be created using the plurality of synchronized videos/measurements of the target area. The composite video may be comprised of the plurality of synchronized videos or measurements of the target area combined together. In embodiments, the composite video may be formed by digital composition, merging, splicing, assembling, combining, matching, fitting, interpolating, extrapolating, patching, pasting, and the like.

The method may further include optional step 430, in which the composite video may be analyzed for at least one of motion and vibration. The analysis may show unwanted vibration, movement, or other information with respect to the target area or an object of interest located within the target area. It may also confirm absence of unwanted or excess vibration in a healthy machine, aiding in a "wellness evaluation" of the machine.

Alternatively, in some embodiments, step 430 may occur before step 420 and comprise the analysis of individual video recordings and/or measurements. In this case the composite video or measurement may be in part based on the analysis of individual video recordings and measurements.

Method 500 is similar to method 400 and depicts specific application to high-rate composite video acquisition with respect to a rotating machine using a video sensor or system synchronized to the rotating machine. Specific details of method 400 may be applied to method 500 and vice versa.

Embodiments of the method 500 may begin with optional step 501, wherein the rotating machine is provided and/or operated in the target area, and/or optional step 502, wherein a video sensor or system, such as the video sensor 111 of sensor system 110, is provided.

Embodiments of the method 500 may also include optional step 503, wherein the video sensor or sensor system is synchronized to the rotating machine. For example, the video sensor or sensor system may be synchronized to the normal rotation of the rotating machine. In one embodiment, the video sensor may be synchronized to the rotating machine using the known description of a clock face for rotating machines. Thus, the video sensor may be synchronized to initiate data capture at the beginning of a rotation, e.g., a 12 o'clock position. Alternatively, the video sensor may be synchronized to initiate video capture at any other selected position. The video sensor may thus be synchronized with a rotational phase of the rotating machine. Additionally, various methods of achieving synchronization may be used as discussed above.

In alternative embodiments, any or all of steps 501, 502, and 503 may not be required, and method 500 may begin with step 510.

In step 510, a plurality of synchronized videos or measurements of the target area are captured by the video sensor system. The plurality of synchronized videos of the target area may comprise, for example, a plurality of video sequences. As discussed above, the plurality of synchronized videos of the target area may be synchronized with each other and/or may be synchronized to the rotating machine. For example, the plurality of synchronized videos of the target area may each begin at a specific selected position in the rotation of a rotating machine or may otherwise be synchronized. Further, if desired, the plurality of synchronized videos may each comprise an identical duration or frame length. Alternatively, different durations and frame lengths may be used. In some embodiments, individual frames may be synchronized, or groups of frames may be synchronized.

As discussed above, the plurality of synchronized videos or measurements may capture a field of view that is smaller than a maximum field of view for the video sensor. Further, a frame rate of the video sensor for the reduced field of view may be greater than a frame rate of the camera for a maximum field of view. In an embodiment, the plurality of synchronized videos of the target area have an increased aspect ratio compared to the maximum field of view. In an embodiment, the plurality of synchronized videos of the target area may comprise a plurality of rectangular sections of the target area.

Like with method 400, it will be understood that synchronization may be achieved at the time of capturing or as a subsequent step. Thus, in some embodiments, step 510 may comprise separate steps of capturing a plurality of videos or measurements of the target area and then synchronizing the videos or measurements.

In step 520, a composite video or measurement may be created from the plurality of videos/measurements of the target area. The composite video may be comprised of the plurality of videos of the target area combined together. In embodiments, the composite video may be formed by digital composition, merging, splicing, composing, assembly, fusion, combining, patching, pasting, and the like.

The method may further include optional step 530, in which the composite video may be analyzed for at least one of motion and vibration. The analysis may show unwanted vibration, movement, displacement, strain or other information with respect to the rotating machine. It may also confirm absence of unwanted or excess vibration in a healthy machine, aiding in a "wellness evaluation" of the machine. Alternatively, in some embodiments, step 530 may occur before step 520 and comprise the analysis of individual video recordings and/or measurements. In this case the composite video or measurement may be in part based on the analysis of individual video recordings and measurements.

Either or both of methods 400 and 500 may include creating or outputting a video representing the analyzed motion, particularly using the composite video or data therefrom. The created or outputted video may more clearly show vibration or other motion. Further, in some embodiments, additional processing or editing may be performed on the video. For example, the video data may be analyzed and filtered to remove or correct unwanted artifacts. The exposure correction can be applied for motions at high frequencies, as described in the U.S. patent application Ser. No. 17/951,961, the entire contents of which are hereby incorporated by reference. The time series data may be transformed to the frequency domain using for example an FFT transform and filtered out using a low-pass, high-pass or bandpass filter. This may be used for example to filter out light flicker artifacts at 60 Hz and 120 Hz (or at 50 Hz and 100 Hz outside the US). The frequency data may then be transformed back to the time domain. In addition, the analyzed motion may be magnified, amplified, or otherwise altered to more clearly show the detected/calculated motion/vibration. For example, movement may be increased, scaled, magnified, amplified, exaggerated, or otherwise changed so that the movement is more noticeable. This may be performed during the creation of the video representation, or may be performed separately, i.e., after creation of the video.

Furthermore, in both methods 400 and 500 the steps of capturing synchronized videos or measurements may be repeated over the same parts of the target area. The repeated videos or measurements may be averaged on a pixel by pixel basis, as described in U.S. patent application Ser. No. 17/345,798, the entire contents of which are hereby incorporated by reference, to improve video or measurement quality, reduce noise, and extract more accurate data sets describing observed motion in the target area.

In general, the process of combining individual videos or measurements from different scans to produce a composite video or measurement may include two separate procedures that may occur separately or in parallel. One of these procedures is a set of steps necessary to combine or merge together individual frames of the videos or time samples of the measurements to form composite frames or measurements. The other procedure is at least one of different methods described for synchronizing different parts of the composite video or measurement in order to produce a coherent, artifact-free result, in which for example different parts of an object captured by different scans move coherently or in-phase. Optionally, this process may also include data normalization, in which data values extracted from different scans may be renormalized to avoid discontinuities at the scan boundaries in the composite video or measurement.

Figure 6:
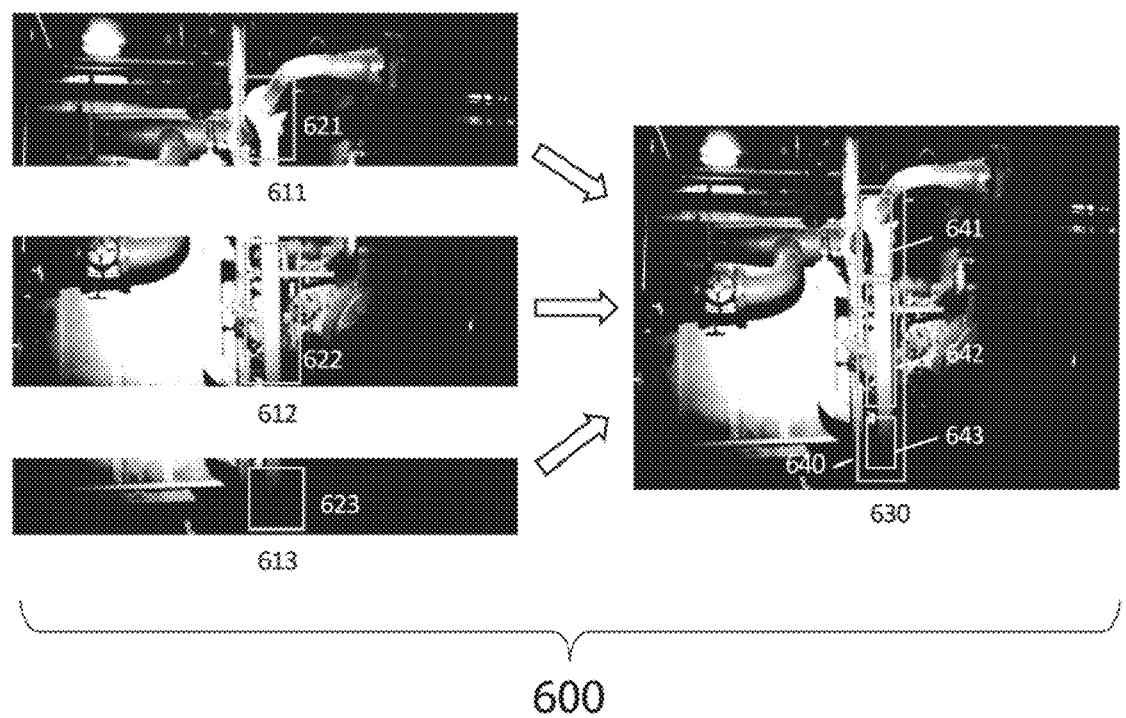
FIG. 6 depicts the multiple measurements of FIG. 2 in more detail according to embodiments of the present invention.

For example, FIG. 6 shows a method 600 illustrating the process of combining videos 611, 612, and 613, corresponding to Scan 1, Scan 2, and Scan 3, respectively in FIG. 2. The videos 611, 612, and 613 are presented schematically in FIG. 2 as single frame images, whereas in fact they are composed of many such images or frames each corresponding to a different moment in time. In this case, Scan 1, Scan 2, and Scan 3 are characterized by their respective field of view sections 211/611, 212/612, and 213/613, which may be non-overlapping neighboring sections of the full field of view. These sections may correspond to different selected pixel areas in the video sensor, such as a camera sensor. The camera sensor may be for example a C3-type camera sensor as discussed above. In this case the composite frames in the composite video may each comprise a linear stack of the respective frames from the individual scan frames. For example, a composite video 630 may comprise composite frames that are produced from individual frames of the videos 611, 612, and 613. As a result, a large observed object 640, which does not fit in any of the individual scans respective field of view, is fully covered in the full field of view of the composite video 630. The data corresponding to the object 640 and its motion includes segments 641, 642, and 643, which in turn are produced from segments 621, 622, and 623 of the data from the individual scans.

Alternatively, Scan 1, Scan 2, and Scan 3 may be characterized by a different set of field-of-view sections covering a target area, which may include overlapping areas, gaps in coverage, different spatial resolution and so on. In this case, additional processing steps may be required to analyze each scan video or measurement. For example, to process the overlapping regions, in which there may be redundant or complimentary data between scan videos or measurements, these steps may include the removal of the redundant data, averaging of the redundant data, interpolation of the redundant data, and similar steps. In order to process gaps between regions, in which case there may be missing data, these steps may include the extrapolation of new values from existing data, filling in default values, calculating simulated values and so on. In the case, of different spatial resolution, these steps may include reformatting and renormalizing at least one of the scan videos or measurements. Furthermore, Scan1, Scan 2, and Scan 3 may be produced by different cameras or the same camera in different positions, which may also require additional processing steps. These processing steps may include for example reformatting and transformation of the original scan videos or measurements, in which for example one data array with a given set of dimensions is transformed into or mapped onto a different data array. In general, a mapping between a frame of a video or time sample of a measurement for a particular scan may involve a linear or non-linear array transform. For example, a 2D array of integers representing light intensity with the width W1 and height H1 may transformed and mapped into a whole or part of another 2D integer array with the width W2 and height H2. Such a mapping may also include non-linear transforms correcting for lens distortions and other optical artifacts.

The steps of producing composite frames or time samples may be superficially similar to the steps of stitching multiple still images to produce a single larger still image, as currently known in the art. For example, a still panoramic image is often made up of multiple still images stitched together. This technique and other similar techniques work well for still scenery containing static, non-moving or slowly moving objects. However, generally speaking, it does not work well or work at all if a scene is dynamic and contains moving objects, especially fast-moving objects. In this case, the stitching of multiple images taken at different times will result in noticeable artifacts along stitching lines (the boundaries between different parts of a panoramic or composite image) or other potentially more dramatic distortions. Also, it would not be conventional to use such a technique in the first place for the purposes of increasing the acquisition rate of a video or a measurement. As FIG. 2 illustrates, the presented method for increasing the acquisition rate involves decreasing an acquired field of view in each individual scan (areas 211, 212, and 213 are smaller than the total area 210 corresponding to the full field of view), whereas the conventional intent of generally known stitching methods in the art to increase the acquired field of view in all individually acquired images to minimize the need or extent of subsequent stitching. Optimization or even consideration of acquisition rates is not a part of the generally known approaches to image stitching in the art. For example, conventional art, such as U.S. Pat. No. 10,382,680 to Polavarapu, the entire contents of which are hereby incorporated by reference, describes a procedure for video stitching from multiple camera that operate concurrently, which relies on existence of common events and features (e.g. audio track event) in each video for time and frame alignment. Otherwise, Polavarapu's approach is similar to the regular still image stitching. Embodiments of the current invention, on the other hand, focuses on a single camera operation, in which individual videos are taken separately and non-concurrently, so that methods provided in the conventional art (e.g. those relying on common and concurrent events and features) are not adequate or appropriate.

The second procedure involves a synchronization or a temporal alignment between different scans, i.e. between videos or measurements corresponding to different scans. Since different scans may be acquired at different times, their time frames in general may be different from each other, i.e. characterized by different start and end times, and/or different acquisition rates or equivalently different sampling time intervals. In this case video synchronization is different from that of concurrent videos, which have the same and closely related time frames. In this case, the individual videos are sequential videos that may be taken from the same position and with the same camera but at different times. As a result, the synchronization is not between the videos in this case, like for example in Polavarapu, but between each video and a trigger or an external time reference (a trigger source, a clock, a reference time-series data, etc.). This procedure may involve one or more of the approaches described below.

Figure 7:
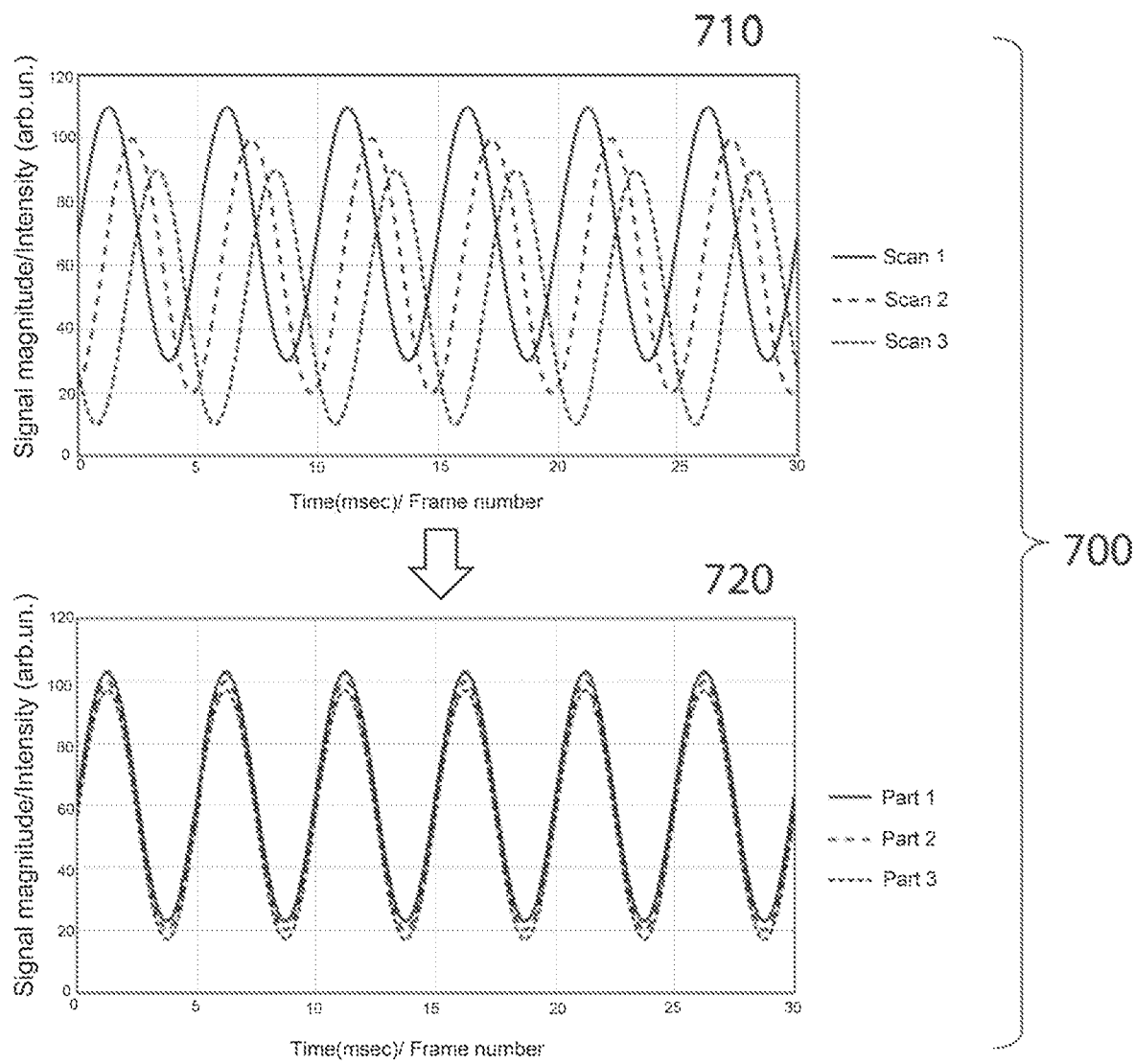
FIG. 7 depicts synchronization of signals according to embodiments of the present invention.

FIG. 7 schematically illustrates a synchronization method 700, which shows alignment among time frames corresponding to Scan 1, Scan 2, and Scan 3 of FIG. 2. A chart 710 shows representative data sets from Scan 1, Scan 2, and Scan 3, which correspond respectively to the segments 621, 622, and 623 in FIG. 6. This data may represent a vibrational motion of the object 224, as deduced from measuring pixel intensities at the edges of the object 224 in corresponding videos (or equivalent parameters in other types of scan measurements). This motion for example could be a vibration at 200 Hz, in which the motions of the constituent parts 641, 642, and 643 may be in phase. As shown in chart 710, however, the time frames of these data sets may be generally unrelated to each other, so that the recorded motions in segments 621, 622, and 623 have random shifts (phases) with respect to each other. In addition, other data distortions and variations may occur, as a result of different scans being acquired at different times. For example, data values such as pixel intensities may be affected by changes in recording settings or conditions from one scan to another scan unrelated to the behavior of an observed object (e.g. due to changes in illumination light intensity). This effect may result in different observed amplitudes of the signal intensities, in addition to time shifting and dephasing, as also shown in FIG. 7, where the maximum, minimum, and average signal intensities may be different for different scans.

The synchronization method 700 realigns the time frames for different scans in 710 and produces the aligned signals, as shown in a chart 720, with their respective aligned time frames. The alignment procedure may involve time shifting or phase shifting of individual signals corresponding to different scans to have the same or similar starting time or phase. The alignment procedure may be applied to a whole or a portion of the data set for the video or measurement of each scan. The selected portion of the data set may be based on a selected region in the field of view, time range or ranges, frequency or frequencies of interest. As shown in 720, the alignment procedure has been applied to parts of the data Part 1, Part 2, and Part 3 corresponding to the parts 641, 642, and 643, respectively.

In addition, the processed data may be normalized, the differences in signal intensities, as initially seen in 710, can be removed or reduced to produce normalized signals, as seen in 720, i.e. with resulting equal signal intensities. The synchronization and normalization procedures help to avoid discontinuities at the scan boundaries and enable creation of composite videos and measurements from individual scans. As illustrated in 720, the signals Part 1, Part 2, and Part 3 have been altered and shifted in both directions, along the time and the intensity axes.

Figure 8:
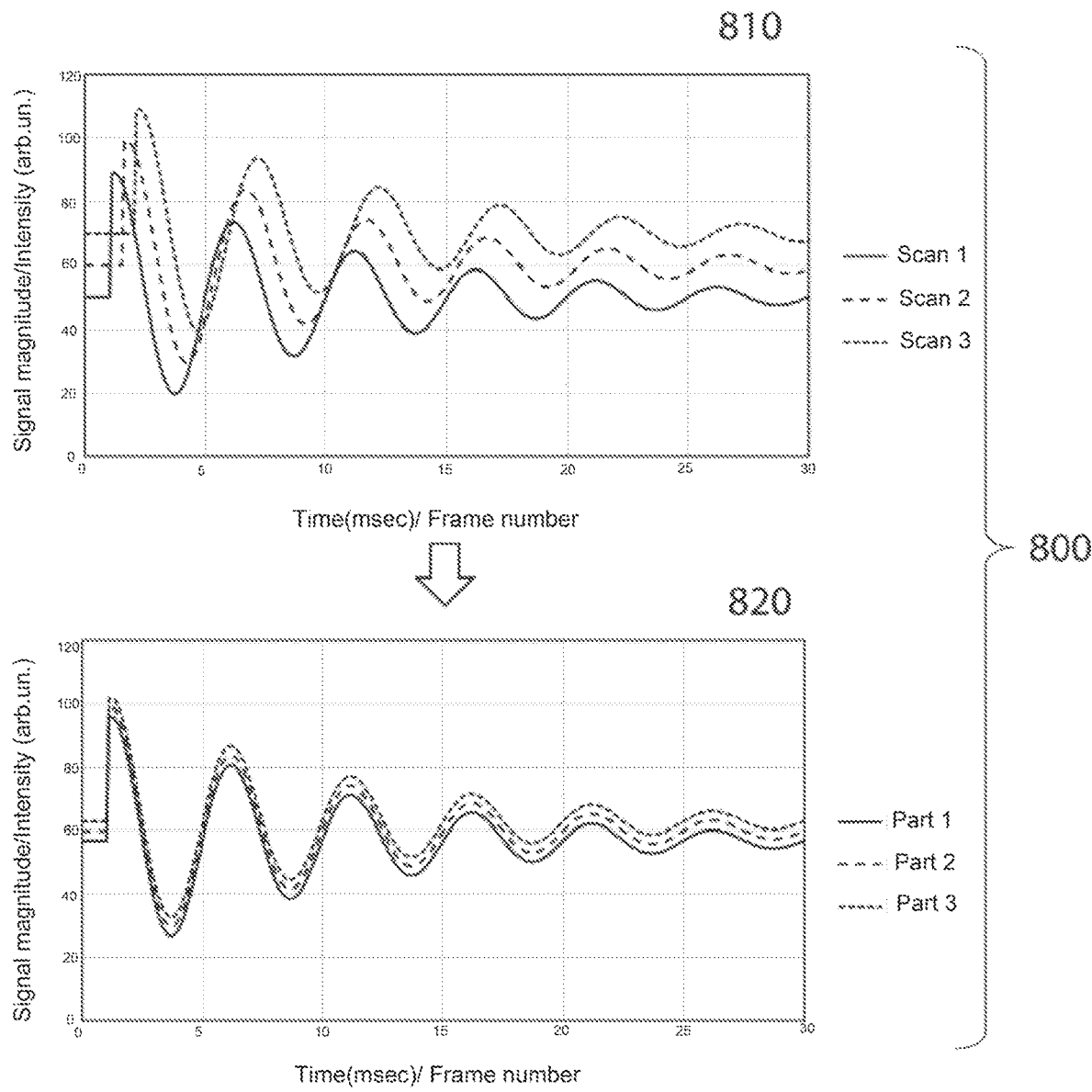
FIG. 8 depicts synchronization of signals according to further embodiments of the present invention.

FIG. 8 shows another example of a synchronization procedure and schematically illustrates a synchronization method 800, which shows alignment among time frames corresponding to Scan 1, Scan 2, and Scan 3 in another use case. Similar to FIG. 7, a chart 810 shows representative data sets from Scan 1, Scan 2, and Scan 3, which may also correspond respectively to the segments 621, 622, and 623 in FIG. 6. This data may represent another type of motion of the object 224, e.g. a resonant motion such as a damped oscillation after an impact. Similar to FIG. 7, the signals recorded in separate scans, Scan 1, Scan 2, and Scan3 in 810, may have different time and/or intensity scales. The processes of synchronization and normalization may align these signals, Part 1, Part 2, and Part 3 shown in a chart 820, to have common time and/or intensity scales or magnitudes.

The synchronization procedure described above may be implemented either in the frequency domain or in the time domain. It may be convenient to implement this procedure in the frequency domain, when an observed motion is periodic and characterized by a certain frequency of interest, or the observed motion is comprised of multiple components, each of which is periodic and characterized by a corresponding frequency of interest. In this case the synchronization between different scans may include the steps of performing a frequency transform of some or all time series data from individual scans, determining corresponding phases at all frequencies of interest, and aligning these phases with each other or with respect to one or more reference phases. The data may be time-varying pixel intensities from selected regions of interest in a given field of view, which in turn may be in raw form or processed via for example averaging or spatial filtering. The frequency transform may be a form of the Fourier transform, such as an FFT. The reference phase at a frequency of interest may be determined from a frequency transform of a portion of the time series data corresponding to a reference object, i.e. a key phasor. Alternatively, in the absence of a reference phase, the phase alignment between different scans may be done for example by measuring time delays Δt between successive scans (e.g. from their time stamps, indicating a start of a scan or a particular frame or time sample in a scan), and by calculating and adjusting respective scan phases at each frequency ω by corresponding phase shifts (Δφ=2πωΔt).

Alternatively, the synchronization procedure may be implemented in the time domain. In this case the synchronization between different scans may include the steps of providing a reference time for each scan and aligning time series data from individual scans with respect to the respective reference time. The reference time may be provided in several different ways including, for example, providing an electrical, optical, acoustic or mechanical signal indicating an onset of a periodic or controlled event (trigger event) as the scan reference time, analyzing and obtaining the reference time from the portion of the scan data corresponding to a reference object, analyzing and obtaining the reference time from another set of data collected synchronously with each scan, and others. The aligning of individual scans may be accomplished by properly configuring the system hardware (e.g. the system 100) and scan acquisition settings, so that the acquired data is automatically time-aligned during the acquisition using for example a hardware trigger for initiating a scan. Alternatively, in a different use case scenario, the aligning of individual scans may be done post-acquisition, using scan data analysis and transformation to produce an equivalent "software trigger" event in each scan and subsequently shift and align respective time series data in each scan with respect to this event. The first scenario of scan synchronization and time alignment using hardware triggering is discussed below.

Figure 9:
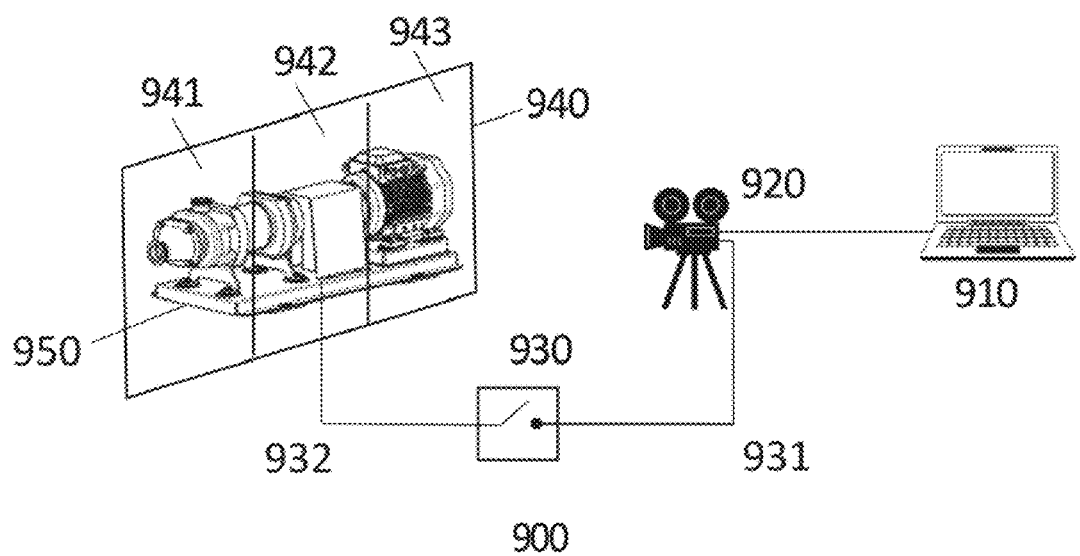
FIG. 9 depicts a video sensor system utilizing hardware-based scan synchronization according to embodiments of the present invention.

In an exemplary embodiment, FIG. 9 shows a video sensor system 900 utilizing hardware-based scan synchronization, which may comprise a computer 910, a video camera 920, and a camera trigger 930. The camera 920 may be connected to the computer 910 and configured to have a full field of view 940, which in turn may be subdivided into three scan areas 941, 942, and 943. In general, the full field of view may be subdivided differently in a different number of scan areas (e.g. 2 or 10), with different shape and/or sizes. The number of scans and corresponding subdivisions in the field of view is in general determined by the ratio of the desired frame rate RD to the maximum base frame rate RB, as ceil(RD/RB). For example, to achieve 400 frames per second acquisition rate (RD) in a camera with 150 frames per second base rate (RB), the full field of view would need to be subdivided into at least 3 sections to produce 3 different scan areas. The full field of view may encompass an observed object of interest, e.g. a pump 950 as shown in FIG. 9. In some use cases, the observed object may include operating machinery, such as the pump 950, that is actively running. The camera trigger may be connected to the camera 920, and also connected or coupled directly or indirectly to the observed object 950. The camera trigger 930 may provide a trigger signal to the camera 920, indicating a start time (or a reference time) for each scan, i.e. the start time of the individual scan's video recording or measurement. The trigger signal in turn may be sourced or extracted from the observed object directly or indirectly. The trigger signal for example may be a periodic electrical signal (e.g. a sine or a square wave), which follows the rotation of the pump shaft or the vibration of one of its parts. The video sensor system 900 may produce results similar to those described in chart 720 of FIG. 7. Several non-exclusive examples of possible trigger sources are presented below.

For example, the pump 950 motor driving current or its phase can be used as a reference timing signal for the trigger 930. An electro-magnetic sensor, which measures the shaft position in the pump 950, may be used as the timing signal. An accelerometer sensor attached to the pump 950 may provide an electrical signal, which follows the rotary or vibrational motion of the pump 950 and may be used as the timing signal. A laser tachometer may be pointed at the pump 950 and provide an electrical signal, which also follows the rotary motion of the pump 950 and may be used as the timing signal. A microphone may be placed near the pump 950 to detect sounds made by the pump 950 and provide a corresponding electrical signal that can be used as the timing signal. Another camera or optical/IR sensor may be placed near the pump 950 and monitor its motion, rotation and vibration and extract a corresponding electrical signal characterizing this motion, which then can be used as the timing signal. If a source of a vibration is external, such as another machine, the timing signal may be extracted from the external machine using any of the above approaches. The electrical signal may be provided directly to the camera 920, or indirectly via an auxiliary apparatus that may provide additional signal conditioning. The latter may include one or more of the following: an electronic amplifier, a current or voltage limiter, a fuse, a filter (low-pass, high-pass, or band-pass), a relay (e.g. a solid state relay), an optical isolator, an analog-to-digital or digital-to-analog converter, a time delay circuit, and alike.

Figure 10:
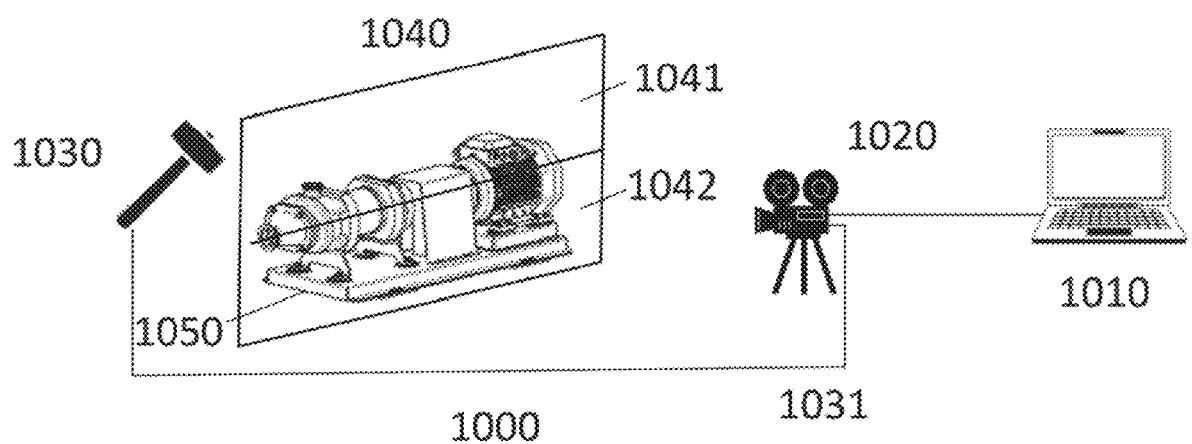
FIG. 10 depicts a video sensor system utilizing hardware-based scan synchronization according to further embodiments of the present invention.

In another exemplary embodiment, FIG. 10 shows a video sensor system 1000 utilizing hardware-based scan synchronization, which may comprise a computer or a processor 1010, a video camera 1020, and a camera trigger 1030. The camera 1020 may be connected to the computer 1010 and configured to have a full field of view 1040, which in turn may be subdivided into scan areas 1041 and 1042. In general, the full field of view may be subdivided differently in a different number of scan areas with different shape and/or sizes. The full field of view may encompass an observed object of interest, e.g. a pump 1050 as shown in FIG. 10. The pump 1050 may be operating or non-operating during video recording or measurement. The camera trigger 1030 may be connected to the camera 1020, and also comprise a hammer or a similar attachment. The hammer or similar attachment is used to strike the object of interest and excite a resonant motion to be monitored by the camera 1020. The camera trigger 1030 may provide a trigger signal to the camera 1020 via a connection 1031, indicating a start time (or a reference time) for each scan, i.e. the start time of the individual scan's video recording or measurement. The trigger signal in turn may be sourced or extracted from the hammer at the moment of impact (using an attached accelerometer for example). The trigger signal may be an electrical signal with a rising or falling edge, or alternatively a circuit closure signal, marking the onset of an individual scan. The hammer impact may be initiated manually for example, which in turn triggers the scan acquisition, i.e. video recording or measurement. The video sensor system 1000 may produce results similar to those described in chart 820 of FIG. 8.

Alternatively, in another embodiment of the present invention, the aligning of individual scans may be done post-acquisition using the equivalent "software trigger" event in each scan and subsequently shift and align respective time series data in each scan with respect to this event. For example, the video sensor system 900 can be modified to exclude the hardware trigger 930, and instead provide means to accurately record acquisition time for each scan, e.g. the start of each scan by using timestamps marking the first or all of the frames. Subsequently, the data in each scan can be aligned in the frequency domain by applying appropriate phase shifts determined by the timestamps as discussed above. Alternatively, a laser (or other convenient light source) may be configured to be coupled to the reference signal, so that its intensity varies in phase with the phase of the observed motion; and its light beams may be directed towards the field of view of the camera, so that they are visible and their intensity variations are discernable in each scan video. As result, the data associated with the reference laser may be used as an internal scan synchronization reference. Similarly, the video sensor system 1000 can be modified to exclude the connection 1031. In this case, the camera 1020 or another camera may be used to observe the motion of the hammer 1030 and detect the moment of an impact, which in turn may be used for synchronization and time alignment either in the time or frequency domain. In this case, the scan may be initiated before the moment of impact either manually or automatically (e.g. using a timer). The detection of the moment of an impact in this case may be done post-acquisition as a part of the overall data analysis.

Figure 11:
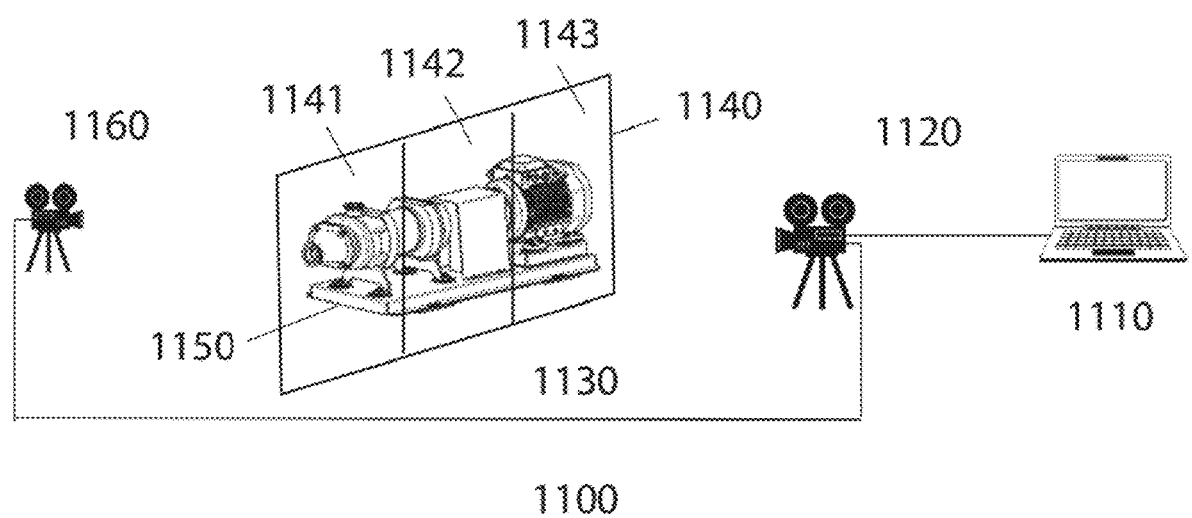
FIG. 11 depicts a video sensor system utilizing software-based scan synchronization according to embodiments of the present invention.

In another exemplary embodiment, FIG. 11 shows a video sensor system 1100 utilizing software-based scan synchronization, which may comprise a computer 1110, a video camera 1120, and a trigger cable 1130. The camera 1120 may be connected to the computer 1110 and configured to have a full field of view 1140, which in turn may be subdivided into three scan areas 1141, 1142, and 1143. The full field of view may encompass an observed object of interest, e.g. a pump 1150 as shown. The trigger cable 1130 may be used to connect the camera 1120 to another camera 1160. The trigger cable 1130 may provide a trigger signal to the camera 1160, providing a mechanism for simultaneous recording or measurement by the cameras 1120 and 1160. The trigger signal may be provided by the camera 1120, e.g. by configuring one of its output connections as a trigger connection. The camera 1160 may have a different field of view from the field of view 1140. The camera 1160 may have a fixed field of view and thus not provide any scan data for producing composite videos or measurements. The camera 1160 may instead provide a reference timing data for synchronizing the individual scans produced by the camera 1120. The reference timing data may be provided by the camera 1160 for example by monitoring and measuring the motion of one or more part of the object 1150 or other reference objects that operate or move synchronously with the object 1150. The acquisition by the camera 1120 may be started by the computer 1110 (automatically or manually). The acquisition of the timing data by the camera 1160 may be also started by the computer 1110 or triggered by the camera 1120 as shown in FIG. 11, simultaneously as it's triggered by the computer 1110. The timing data may for example describe the rotation of the pump 1150 and provide corresponding phase measurements concurrent with the scan videos produced by the camera 1120. Unlike hardware synchronization in which the time alignment is automatic, this software-based synchronization requires additional processing steps of time or phase shifts between different scan videos, where for example a phase shift for a particular scan video is determined by the phase measurement produced using the camera 1160. This may allow then the synchronization between different scan videos produced by the camera 1120 and the creation of the composite video containing the combined synchronized data from those scans.

In another embodiment of the present invention, the video system 100 may be further expanded to include other sensor devices, e.g. an additional camera. The additional camera may be used to acquire additional videos or measurements with different sections of the same target area, concurrently or separately with the sensor device 111. The additional camera may be used to expand the size of the target area. The additional camera may operate at the same frame or sampling rate as the sensor device 111. The field of view of the additional camera may also contain different parts that are recorded at different scan times. The videos and measurements of the additional camera (or other sensor) may be synchronized and combined with the videos and measurements of the sensor device 111 using the methods described above.

Figure 12:
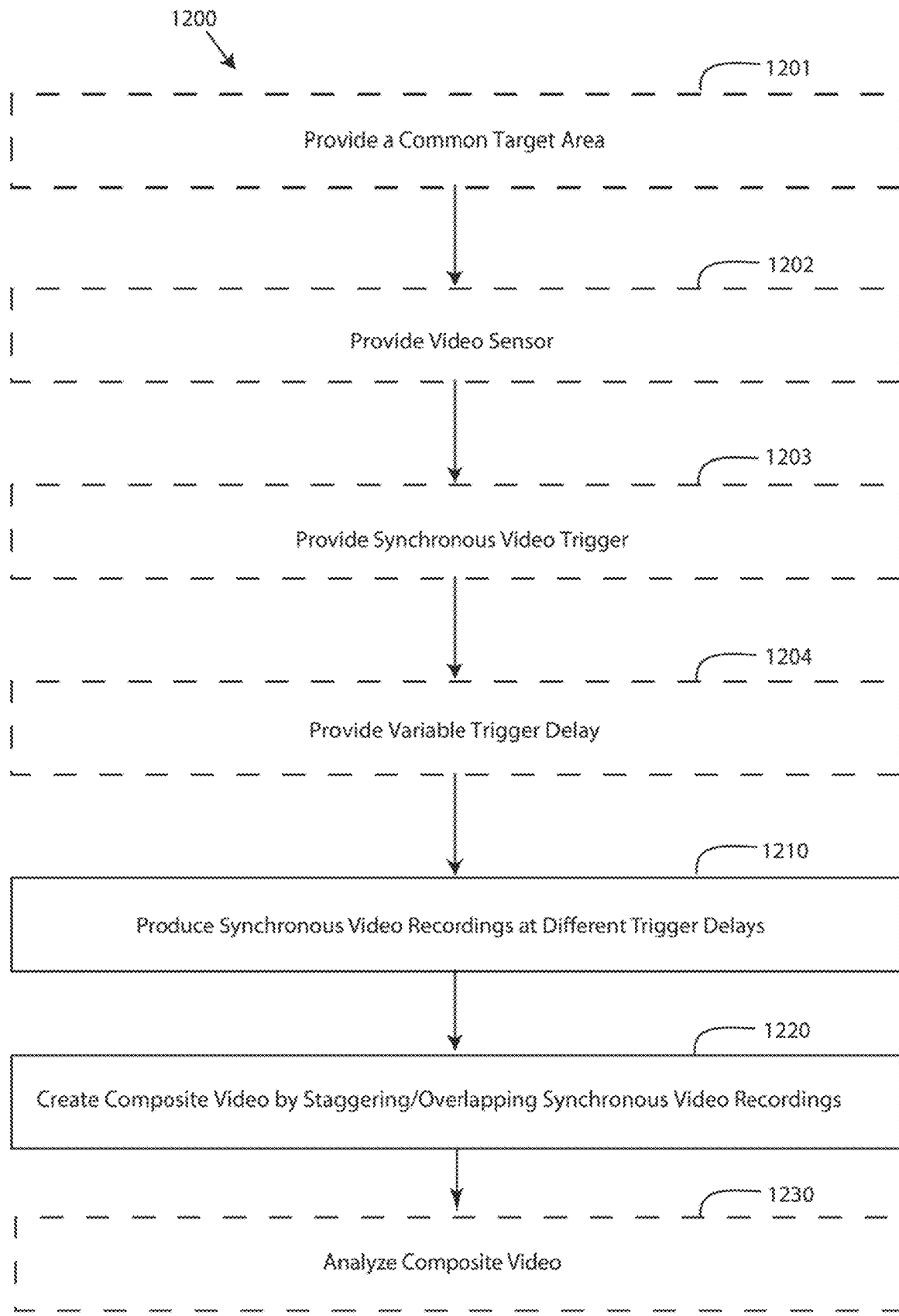
FIG. 12 depicts a flow chart of a method for high-rate composite video acquisition according to further embodiments of the present invention.

In another embodiment of the present invention, FIG. 12 shows a method 1200 for high-rate composite video acquisition. The method 1200 may be similar to methods 400 and 500 discussed above. Embodiments of the method 1200 may begin with optional step 1201 wherein a common target area is provided, and/or optional step 1202 wherein a video sensor is provided, and/or optional step 1203 wherein a synchronous video trigger is provided, and/or optional step 1204 wherein a variable trigger delay is provided.

In step 1210, synchronous video recordings of the target area are produced at different trigger delays. Like with methods 400 and 500, it will be understood that synchronization may be achieved at the time of capturing or as a subsequent step. Thus, in some embodiments, step 1210 may comprise separate steps of capturing a plurality of videos or measurements of the target area and then synchronizing the videos or measurements to produce synchronous video recordings.

In step 1220 a composite video is produced by staggering and/or overlapping synchronous video recordings.

The method may further include optional step 1230, in which the composite video may be analyzed for at least one of motion and vibration. The analysis may show unwanted vibration, movement, or other information with respect to the target area or an object of interest located within the target area. It may also confirm absence of unwanted or excess vibration in a healthy machine, aiding in a "wellness evaluation" of the machine.

The video sensor used in the method 1200 may be characterized by a base frame or sampling rate $R_S$ (no greater than the maximum base rate RB). The method 1200 however effectively allows video acquisition across the whole target area at rates greater than $R_S$. For example, the method 1200 may be used to increase the effective acquisition rate $R_A$ by a factor of two. In this case the target area may include a moving object of interest, e.g. vibrating at a frequency of interest $f_i$. A synchronous video trigger signal may be provided as discussed above at the frequency of interest $f_i$. Also, a variable time delay may be applied to the trigger signal. Then two synchronous and equal length video recordings may be produced using the delayed trigger signals: one at zero delay and another at a delay equal to $1/(2R_S)$. The videos may be synchronous with the delayed triggered signals. The two synchronous videos may then be overlayed in a staggered fashion to produce a composite video, in which every frame from the first video is followed by the same numbered frame from the second video. As a result, a composite video describing the object vibration at the frequency of interest may be obtained at the equivalent frame rate of $2R_S$. Of course, the method 1200 can be used to achieve virtually any desired acquisition rate $R_A$, by selecting an appropriate number of scans N and an appropriate base rate $R_S$ for a single scan, so that $R_A$=NRS (the i-th scan would then have a corresponding time delay of (i−1)/NRS).

Aspects of the present invention are described herein with reference to the flowchart illustrations. It will be understood that each block of the flowchart illustrations can be implemented by computer-readable program instructions.

Figure 13:
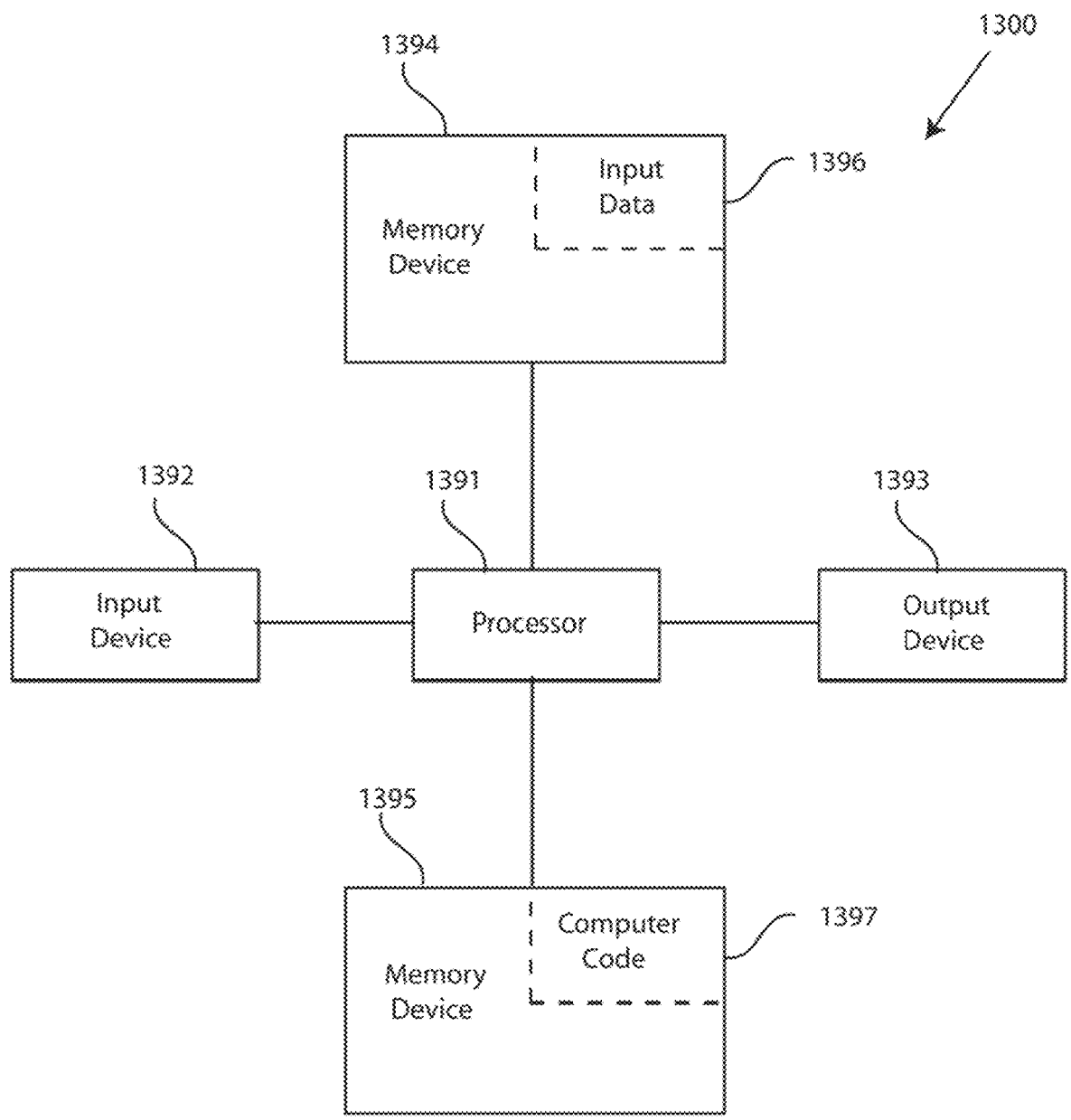
FIG. 13 depicts a block diagram of a computer system for a system of FIGS. 1, 9, 10, and/or 11 capable of implementing a method for high-rate composite video acquisition of FIGS. 4, 5, and 12 in accordance with embodiments of the present invention.

FIG. 13 depicts a block diagram of a computer system 1300 for a system such as system 100 of FIG. 1, 900 of FIG. 9, 1000 of FIG. 10, or 1100 of FIG. 11, capable of implementing methods for high-rate composite video acquisition of FIGS. 4, 5, and 12 in accordance with embodiments of the present invention. The computer system 1300 may generally comprise a processor 1391, an input device 1392 coupled to the processor 1391, an output device 1393 coupled to the processor 1391, and memory devices 1394 and 1395 each coupled to the processor 1391. The input device 1392, output device 1393 and memory devices 1394, 1395 may each be coupled to the processor 1391 via a bus. Processor 1391 may perform computations and control the functions of computer system 1300, including executing instructions included in the computer code 1397 for the tools and programs capable of implementing a method for high-rate video acquisition in the manner prescribed by the embodiments of FIGS. 4, 5, and 12 using the systems 100 of FIG. 1, 900 of FIG. 9, 1000 of FIG. 10, or 1100 of FIG. 11, wherein the instructions of the computer code 1397 may be executed by processor 1391 via memory device 1395. The computer code 1397 may include software or program instructions that may implement one or more algorithms for implementing the method for detection, as described in detail above. The processor 1391 executes the computer code 1397. Processor 13 91 may include a single processing unit, or may be distributed across one or more processing units in one or more locations (e.g., on a client and server).

The memory device 1394 may include input data 1396. The input data 1396 includes any inputs required by the computer code 1397. The output device 1393 displays output from the computer code 1397. Either or both memory devices 1394 and 1395 may be used as a computer usable storage medium (or program storage device) having a computer-readable program embodied therein and/or having other data stored therein, wherein the computer-readable program comprises the computer code 1397. Generally, a computer program product (or, alternatively, an article of manufacture) of the computer system 1300 may comprise said computer usable storage medium (or said program storage device).

Memory devices 1394, 1395 include any known computer-readable storage medium, including those described in detail below. In one embodiment, cache memory elements of memory devices 1394, 1395 may provide temporary storage of at least some program code (e.g., computer code 1397) in order to reduce the number of times code must be retrieved from bulk storage while instructions of the computer code 1397 are executed. Moreover, similar to processor 1391, memory devices 1394, 1395 may reside at a single physical location, including one or more types of data storage, or be distributed across a plurality of physical systems in various forms. Further, memory devices 1394, 1395 can include data distributed across, for example, a local area network (LAN) or a wide area network (WAN). Further, memory devices 1394, 1395 may include an operating system (not shown) and may include other systems not shown in FIG. 13.

In some embodiments, the computer system 1300 may further be coupled to an Input/output (I/O) interface and a computer data storage unit. An I/O interface may include any system for exchanging information to or from an input device 1392 or output device 1393. The input device 1392 may be, inter alia, a keyboard, a mouse, etc. or in some embodiments the touchscreen of a computing device. The output device 1393 may be, inter alia, a printer, a plotter, a display device (such as a computer screen), a magnetic tape, a removable hard disk, a floppy disk, etc. The memory devices 1394 and 1395 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 1300, and may include any type of transmission link, including electrical, optical, wireless, etc.

An I/O interface may allow computer system 1300 to store information (e.g., data or program instructions such as program code 1397) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to detection and analysis of motion. Thus, an embodiment of the present invention discloses a process for supporting computer infrastructure, where the process includes providing at least one support service for at least one of integrating, hosting, maintaining and deploying computer-readable code (e.g., program code 1397) in a computer system (e.g., computer system 1300) including one or more processor(s) 1391, wherein the processor(s) carry out instructions contained in the computer code 1397 for detection and analysis of motion. Another embodiment discloses a process for supporting computer infrastructure, where the process includes integrating computer-readable program code into a computer system 1300 including a processor.

The step of integrating includes storing the program code in a computer-readable storage device of the computer system 1300 through use of the processor. The program code, upon being executed by the processor, implements a method for detection and analysis of motion or vibration. Thus, the present invention discloses a process for supporting, deploying and/or integrating computer infrastructure, integrating, hosting, maintaining, and deploying computer-readable code into the computer system 1300, wherein the code in combination with the computer system 1300 is capable of performing a method for detection and analysis of motion.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, C#, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
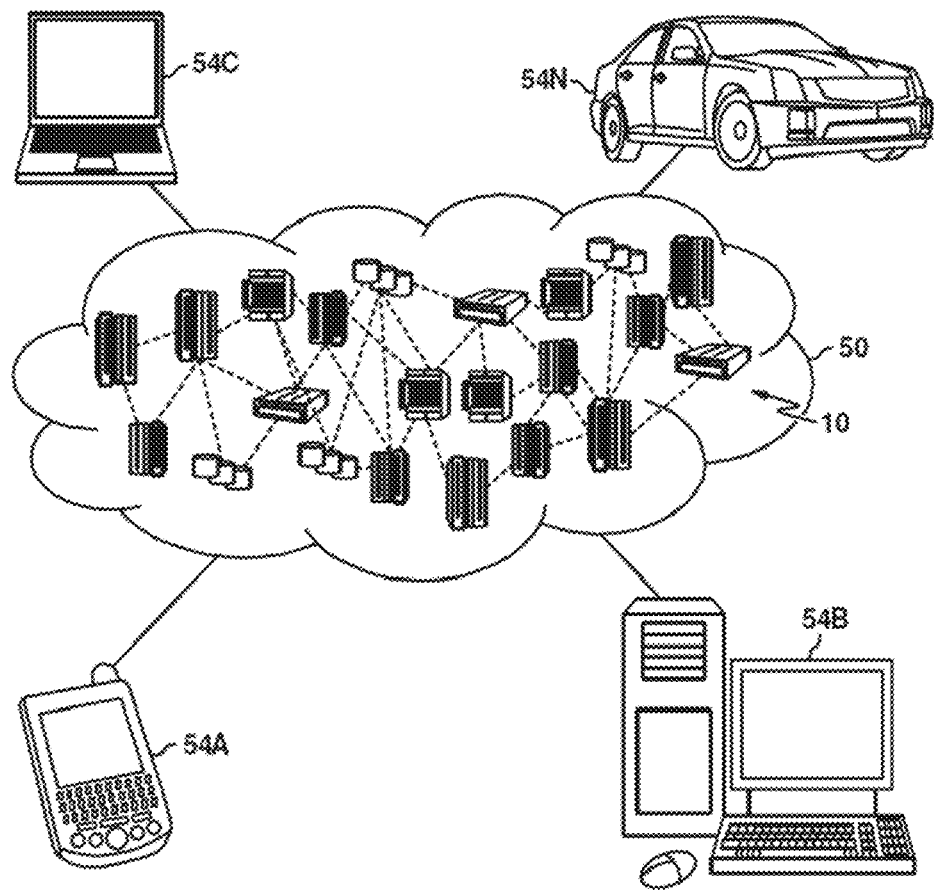
FIG. 14 depicts a cloud computing environment, in accordance with embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 14 are intended to be illustrative only and that computing nodes 10 and cloud computing environment 50 can communicate with any type of computerized device over any type of network and/or network addressable connection (e.g., using a web browser).

Figure 15:
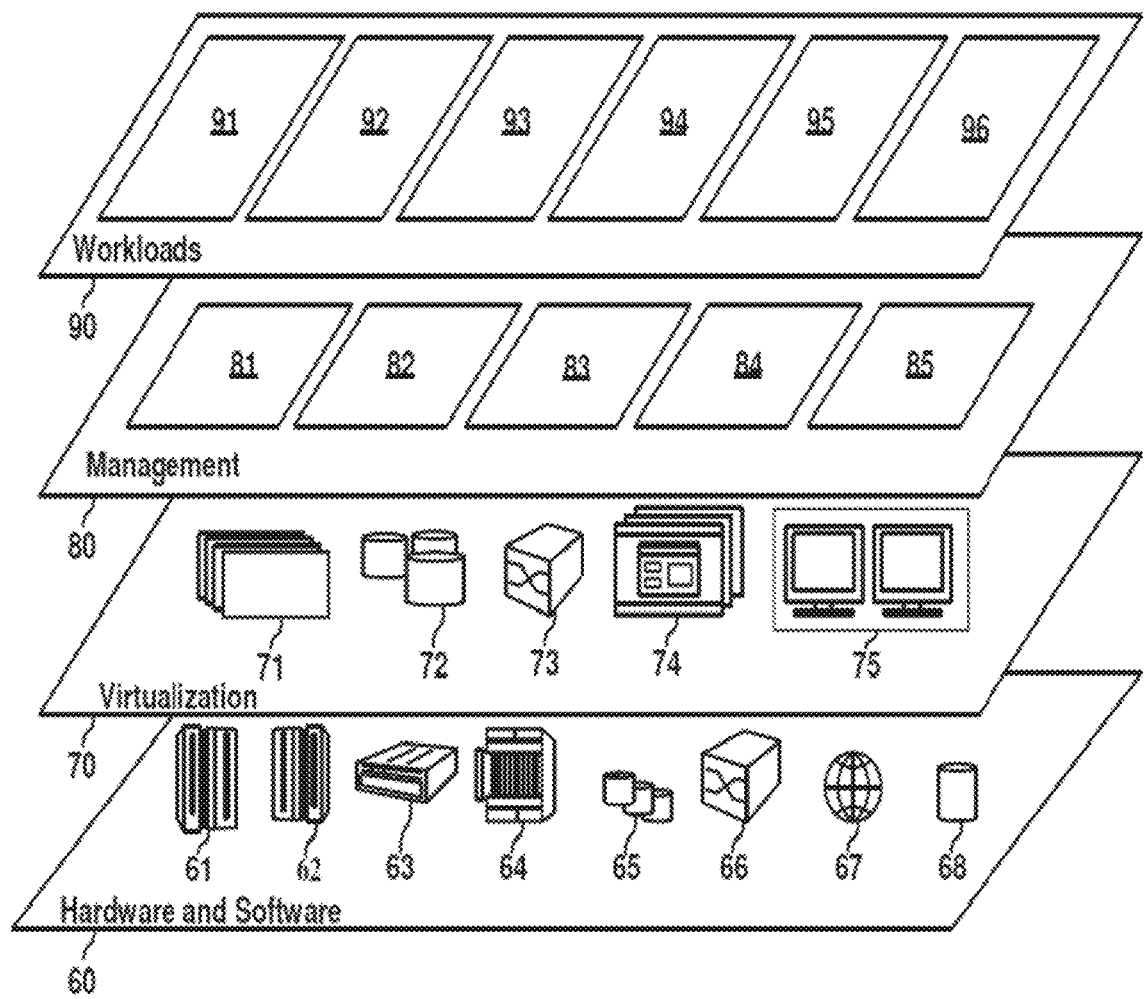
FIG. 15 depicts abstraction model layers, in accordance with embodiments of the present invention.

Referring now to FIG. 15, a set of functional abstraction layers provided by cloud computing environment 50 (see FIG. 14) are shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and high-rate composite video acquisition 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for high-rate video acquisition, comprising:
providing a video sensor;
providing a target area;
providing a synchronization reference;
capturing a plurality of videos of the target area, wherein each video of the plurality of videos captures a part of the target area;
synchronizing the plurality of videos using the synchronization reference; and
creating a composite video;
wherein providing the synchronization reference includes providing a moving reference object, recording the moving reference object concurrently with the plurality of videos, and extracting the synchronization reference from the recording of the moving reference object, and/or
wherein providing the synchronization reference includes providing a second video sensor, providing a moving reference object, recording video of the moving reference object using the second video sensor concurrently with the capturing of the plurality of videos, and extracting the synchronization reference from the recorded video of the moving reference object.

2. The method of claim 1, further comprising configuring the video sensor to provide a plurality of fields of view, wherein the plurality of fields of view are used to capture the parts of the target area.

3. The method of claim 1, wherein the video sensor has a maximum field of view, and wherein at least one video of the plurality of videos uses a reduced field of view smaller than the maximum field of view.

4. The method of claim 3, wherein a frame rate of the video sensor for the reduced field of view is greater than a maximum frame rate of the video sensor for the maximum field of view.

5. The method of claim 3, wherein the reduced field of view has a height smaller than a maximum height of the video sensor.

6. The method of claim 1, wherein the plurality of synchronized videos of the target area comprise a plurality of rectangular sections of the target area.

7. The method of claim 1, wherein the synchronization reference is an electric signal and wherein the electric signal is used to trigger the capturing of the plurality of videos of the target area.

8. The method of claim 7, wherein the electric signal is produced by one of an accelerometer, a tachometer, a motor, a driver, and a hammer.

9. The method of claim 1, wherein the target area includes an object and at least one of motion and vibration of the object is analyzed.

10. The method of claim 9, wherein the synchronization reference is coupled to at least one of the object and a motion of the object.

11. The method of claim 9, wherein the object is a rotating machine and the synchronization reference is a rotational phase of the rotating machine.

12. The method of claim 1, wherein providing the synchronization reference includes providing video acquisition time stamps and calculating corresponding phase shifts at at least one frequency.

13. The method of claim 1, wherein creating the composite video comprises digital composition of frames of the plurality of videos.

14. The method of claim 1, further comprising providing a time delay between the synchronization reference and the plurality of videos.

15. A method for high-rate video acquisition, comprising:
providing a synchronization reference;
capturing a plurality of videos of a target area;
and creating a composite video from the plurality of videos of the target area;
wherein the plurality of videos each capture a different part of the target area or the plurality of videos each capture the entire target area;
wherein, when the plurality of videos each capture a different part of the target area, the plurality of videos are synchronized to the synchronization reference; and
wherein, when the plurality of videos each capture the entire target area, the plurality of videos are synchronized to the synchronization reference but are each offset by a variable delay;
wherein providing the synchronization reference includes providing a moving reference object, recording the moving reference object concurrently with the plurality of videos, and extracting the synchronization reference from the recording of the moving reference object, and/or
wherein providing the synchronization reference includes providing a video sensor, providing a moving reference object, recording video of the moving reference object using the video sensor concurrently with the capturing of the plurality of videos, and extracting the synchronization reference from the recorded video of the moving reference object.

16. The method of claim 15, wherein the target area includes an object and at least one of motion and vibration of the object is analyzed.

17. A computer program product, comprising a computer readable hardware storage device storing a computer readable program code, the computer readable program code comprising an algorithm that when executed by a computer processor of a computing system implements a method for high-rate composite video acquisition, the method comprising:

capturing a plurality of videos of a target area, wherein each video of the plurality of videos captures a subset of the target area;

providing a synchronization reference, wherein the synchronization reference is provided by: a) providing a moving reference object, recording the moving reference object concurrently with the plurality of videos, and extracting the synchronization reference from the recording of the moving reference object, and/or b) providing a synchronization video sensor, providing a moving reference object, recording video of the moving reference object using the synchronization video sensor concurrently with the capturing of the plurality of videos, and extracting the synchronization reference from the recorded video of the moving reference object;

synchronizing the plurality of videos using the synchronization reference; and creating a composite video from the plurality of videos of the target area.

18. The computer program product of claim 17, wherein the target area includes an object and at least one of motion and vibration of the object is analyzed.

\* \* \* \* \*